(12) United States Patent
Sanjo

(10) Patent No.: US 9,195,035 B2
(45) Date of Patent: Nov. 24, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Yotaro Sanjo, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 126 days.

(21) Appl. No.: 13/861,816

(22) Filed: Apr. 12, 2013

(65) Prior Publication Data

US 2014/0029112 A1    Jan. 30, 2014

(30) Foreign Application Priority Data

Jul. 25, 2012  (JP) .................................. 2012-164266

(51) Int. Cl.

| | | |
|---|---|---|
| *G02B 15/16* | (2006.01) | |
| *G02B 15/167* | (2006.01) | |
| *G02B 15/173* | (2006.01) | |
| *G02B 15/14* | (2006.01) | |
| *G02B 15/17* | (2006.01) | |

(52) U.S. Cl.

CPC .............. *G02B 15/14* (2013.01); *G02B 15/167* (2013.01); *G02B 15/17* (2013.01); *G02B 15/173* (2013.01); *G02B 15/16* (2013.01)

(58) Field of Classification Search

CPC ....... G02B 15/16; G02B 16/17; G02B 15/173
USPC .......................................... 359/687, 686, 688
See application file for complete search history.

(56) References Cited

U.S. PATENT DOCUMENTS

| | | | | |
|---|---|---|---|---|
| 5,966,246 | A * | 10/1999 | Yoshikawa | .................... 359/687 |
| 7,907,355 | B2 * | 3/2011 | Kodaira et al. | ................ 359/775 |
| 2013/0271630 | A1 * | 10/2013 | Nakamura | ..................... 359/687 |
| 2013/0271643 | A1 * | 10/2013 | Inomoto | ....................... 359/687 |

(Continued)

FOREIGN PATENT DOCUMENTS

| | | |
|---|---|---|
| JP | 6-242378 A | 9/1994 |
| JP | 2001-021804 A | 1/2001 |

OTHER PUBLICATIONS

"Ohara Inc. : Optical Glass Data." Ohara Inc. : Optical Glass Data. S-LAH59 Web. Oct. 8, 2014. <http://www.ohara-inc.co.jp/en/product/optical/list/index.html>.*

(Continued)

*Primary Examiner* — Zachary Wilkes

(74) *Attorney, Agent, or Firm* — Rossi, Kimms & McDowell LLP

(57) ABSTRACT

A zoom lens includes, in order from object side: a positive first unit immovable for zooming; a negative second unit moving during zooming; a third unit moving during zooming; a stop; and a positive fourth unit immovable for zooming. The first unit includes, in order from object side, a fixed negative front first unit, a positive middle first unit moving for focusing, and a fixed positive rear first lens unit. Each of the front first and the second units includes at least one positive lens and two negative lenses. Average of Abbe constants and average of partial dispersion ratios of positive lenses in the front first unit, average of Abbe constants and average of partial dispersion ratios of negative lenses in the front first unit, combined focal length of the positive lenses in the front first unit and focal length of the front first unit are appropriately set.

12 Claims, 15 Drawing Sheets

(56) References Cited

U.S. PATENT DOCUMENTS

2013/0271849 A1* 10/2013 Hori .............................. 359/687
2013/0271850 A1* 10/2013 Shimomura .................. 359/687

OTHER PUBLICATIONS

"Ohara Inc. : Optical Glass Data." Ohara Inc. : Optical Glass Data. S-LAH58 Web. Oct. 8, 2014. <http://www.ohara-inc.co.jp/en/product/optical/list/index.html>.*
"Ohara Inc. : Optical Glass Data." Ohara Inc. : Optical Glass Data. S-LAM58 Web. Oct. 8, 2014. <http://www.ohara-inc.co.jp/en/product/optical/list/index.html>.*
"Ohara Inc. : Optical Glass Data." Ohara Inc. : Optical Glass Data. S-TIH6. Web. Oct. 8, 2014. <http://www.ohara-inc.co.jp/en/product/optical/list/index.html>.*
"Ohara Inc. : Optical Glass Data." Ohara Inc. : Optical Glass Data. S-LAH55V Web. Oct. 8, 2014. <http://www.ohara-inc.co.jp/en/product/optical/list/index.html>.*
"Ohara Inc. : Optical Glass Data." Ohara Inc. : Optical Glass Data. S-LAH66 Web. Oct. 8, 2014. <http://www.ohara-inc.co.jp/en/product/optical/list/index.html>.*
"Ohara Inc. : Optical Glass Data." Ohara Inc. : Optical Glass Data. S-LAH65V Web. Oct. 8, 2014. <http://www.ohara-inc.co.jp/en/product/optical/list/index.html>.*
"Ohara Inc. : Optical Glass Data." Ohara Inc. : Optical Glass Data. S-TIM22. Web. Feb. 9, 2015. <http://www.ohara-inc.co.jp/en/product/optical/list/index.html>.*
"Ohara Inc. : Optical Glass Data." Ohara Inc. : Optical Glass Data. S-NPH2. Web. Feb. 9, 2015. <http://www.ohara-inc.co.jp/en/product/optical/list/index.html>.*

* cited by examiner

ZOOM LENS AND IMAGE PICKUP APPARATUS INCLUDING THE SAME

BACKGROUND OF THE INVENTION

1. Field of the Invention

The present invention relates to a zoom lens which is suitable for use in a broadcasting television camera, a video camera, a digital still camera, and a silver halide film camera, and to an image pickup apparatus including the zoom lens.

2. Description of the Related Art

In recent years, there has been demanded a zoom lens having a high aperture ratio, a high zoom ratio, and high optical performance for an image pickup apparatus such as a television camera, a silver halide film camera, a digital camera, and a video camera.

Positive lead telephoto type four-unit zoom lenses, in which four lens units are provided in total, and one of the lens units located closest to an object side has positive refractive power, have been known as zoom lenses having a high zoom ratio.

This four-unit zoom lens includes, in an order of from the object side to the image side, a first lens unit having positive refractive power for focusing, a second lens unit having negative refractive power for varying magnification, a third lens unit for correcting image plane variation due to magnification-varying, and a fourth lens unit having positive refractive power for imaging.

As to this four-unit zoom lens, there is known a four-unit zoom lens utilizing a so-called three-unit inner focus type (see Japanese Patent Application Laid-Open No. H06-242378, and Japanese Patent Application Laid-Open No. 2001-21804).

Here, in the three-unit inner focus type, the first lens unit having positive refractive power includes, in an order of from the object side to the image side, a front first lens unit having negative refractive power, a middle first lens unit having positive refractive power, and a rear first lens unit having positive refractive power. In the focusing method thereof, the middle first lens unit is moved to the image plane side when focusing from an object at infinity to an object at short distance.

Japanese Patent Application Laid-Open No. H06-242378 discloses a large diameter and high zoom-ratio zoom lens having a zoom ratio of approximately 8.0 to 17.6, a photographing angle of field (angle of field) of approximately 65 to 87 degrees at a wide angle end, and an F number of approximately 1.6 to 2.2.

Japanese Patent Application Laid-Open No. 2001-21804 discloses a large diameter and high zoom-ratio zoom lens having a zoom ratio of approximately 8.0 to 14.9, a photographing angle of field (angle of field) of approximately 79 to 88 degrees at a wide angle end, and an F number of approximately 1.6 to 2.1.

For the positive lead type four-unit zoom lens having the above-mentioned structure, it is relatively easy to realize a high zoom ratio.

However, as the zoom ratio becomes higher, variations of various aberrations become larger, and hence it becomes difficult to obtain high optical performance over the entire zoom range.

In particular, both in axial chromatic aberration and in lateral chromatic aberration, a zoom (zoom variation) increases. Therefore, in order to obtain high imaging performance, it is important to appropriately correct not only primary chromatic aberration but also secondary spectrum.

In the positive lead type four-unit zoom lens using the three-unit inner focus type, in order to achieve a higher zoom ratio and to appropriately correct chromatic aberration so that high optical performance can be obtained, it is important to appropriately set a structure of the front first lens unit located closer to the object side than the magnification-varying lens unit.

SUMMARY OF THE INVENTION

The present invention provides a zoom lens having a high zoom ratio, in which zoom variation, particularly of lateral chromatic aberration, is appropriately corrected over the entire zoom range from a wide angle end to a telephoto end so that high optical performance is realized over the entire zoom range, and to provide an image pickup apparatus including the zoom lens.

According to an exemplary embodiment of the present invention, there is provided a zoom lens including, in order from an object side: a first lens unit having positive refractive power which does not move for varying magnification; a second lens unit having negative refractive power which moves during magnification-varying; a third lens unit which moves during magnification-varying; an aperture stop which does not move; and a fourth lens unit having positive refractive power which does not move for varying magnification, in which: the first lens unit includes, in order from the object side, a front first lens unit having negative refractive power which does not move, a middle first lens unit having positive refractive power which moves for focus adjustment, and a rear first lens unit having positive refractive power which does not move; each of the front first lens unit and the second lens unit includes at least one positive lens and at least two negative lenses; and the following expressions are satisfied:

$$(\theta 11p - \theta 11n)/(\nu 11p - \nu 11n) < -3.2 \times 10^{-3} \qquad (1)$$

$$-8.0 < f11cp/f11 < -1.0 \qquad (2)$$

where $\nu 11p$ and $\theta 11p$ respectively represent an average value of Abbe constants and an average value of partial dispersion ratios of lenses having positive refractive power in the front first lens unit, $\nu 11n$ and $\theta 11n$ respectively represent an average value of Abbe constants and an average value of partial dispersion ratios of lenses having negative refractive power in the front first lens unit, $f11cp$ represents a combined focal length of the lenses having positive refractive power in the front first lens unit and $f11$ represents a focal length of the front first lens unit.

According to the present invention, it is possible to obtain the zoom lens having a high zoom ratio, in which lateral chromatic aberration is particularly appropriately corrected over the entire zoom range from the wide angle end to the telephoto end so that high optical performance is realized over the entire zoom range, and to obtain an image pickup apparatus including the zoom lens.

Further features of the present invention will become apparent from the following description of exemplary embodiments with reference to the attached drawings.

DESCRIPTION OF THE EMBODIMENTS

Figure 1:
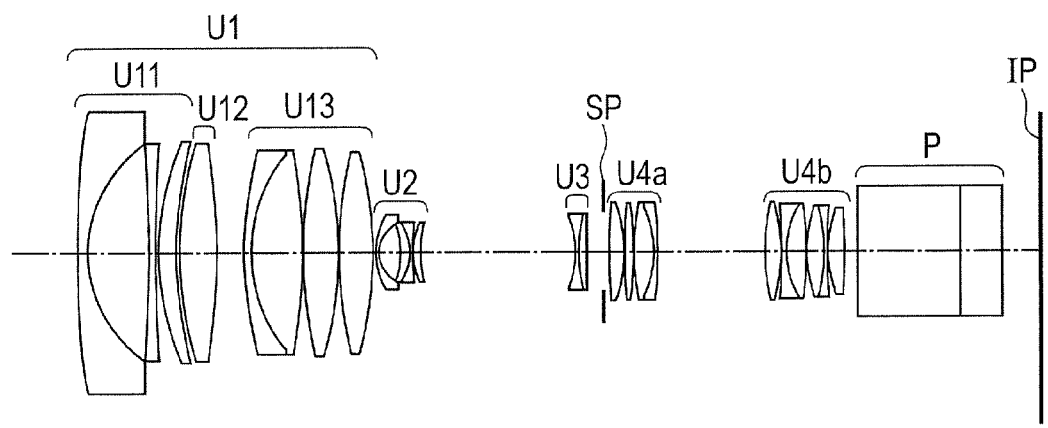
FIG. 1 is a cross-sectional view at a wide angle end in focus at infinity of a zoom lens according to Embodiment 1 of the present invention.

In the following, a zoom lens and an image pickup apparatus including the zoom lens according to an example of the present invention are described.

The zoom lens of the present invention includes, in order from the object side, a first lens unit U1 having positive refractive power which does not move for varying magnification, a second lens unit U2 having negative refractive power which moves in an optical axis direction during magnification-varying, a third lens unit U3 which moves in the optical axis direction during magnification-varying so as to correct image plane variation due to magnification-varying, an aperture stop SP, and a fourth lens unit U4 having positive refractive power which does not move for varying magnification. In addition, the first lens unit U1 includes, in order from the object side, a front first lens unit U11 having negative refractive power which does not move, a middle first lens unit U12 having positive refractive power which moves for focus adjustment, and a rear first lens unit U13 as a fixed lens unit having positive refractive power. Each of the front first lens unit U11 and the second lens unit U2 is constituted of at least one positive lens and at least two negative lenses. An average value of Abbe constants and an average value of partial dispersion ratios of the lenses having positive refractive power in the front first lens unit are denoted by ν11p and θ11p, respectively. An average value of Abbe constants and an average value of partial dispersion ratios of the lenses having negative refractive power in the front first lens unit are denoted by ν11n and θ11n, respectively. A focal length of the front first lens unit U11 is denoted by f11. A combined focal length of lenses having positive refractive power in the front first lens unit U11 is denoted by f11cp. Then, the following conditions are satisfied.

$$(\theta 11p - \theta 11n)/(\nu 11p - \nu 11n) < -3.2 \times 10^{-3} \quad (1)$$

$$-8.0 < f11cp/f11 < -1.0 \quad (2)$$

Here, the partial dispersion ratio and the Abbe constant of the material of optical elements (lenses) used in this embodiment are as follows.

Refractive indexes for g-line (435.8 nm), F-line (486.1 nm), d-line (587.6 nm), and C-line (656.3 nm) of Fraunhofer lines are denoted by Ng, NF, Nd, and NC, respectively. Then, the Abbe constant νd and the partial dispersion ratio θgF for the g-line and the F-line are given as follows.

$$\nu d = (Nd - 1)/(NF - NC) \quad (3)$$

$$\theta gF = (Ng - NF)/(NF - NC) \quad (4)$$

In each embodiment, a lens structure of the front first lens unit U11 is specified as described above, and the conditional expressions (1) and (2) are satisfied. Thus, zoom variation of a secondary spectrum of lateral chromatic aberration is effectively corrected.

Here, an axial paraxial ray and a pupil paraxial ray are rays defined as follows. The axial paraxial ray is a paraxial ray that enters an optical system in parallel to the optical axis with an incident height of 1, in which a focal length at a wide angle end of the entire optical system is normalized to be 1. The pupil paraxial ray is a paraxial ray that passes through an intersection of an entrance pupil and the optical axis of the optical system among rays entering the maximum image height in the image plane, in which the focal length at the wide angle end of the entire optical system is normalized to be 1. In this case, the object is on the left side of the optical system, and rays entering the optical system from the object side propagate from left to right.

Figure 14:
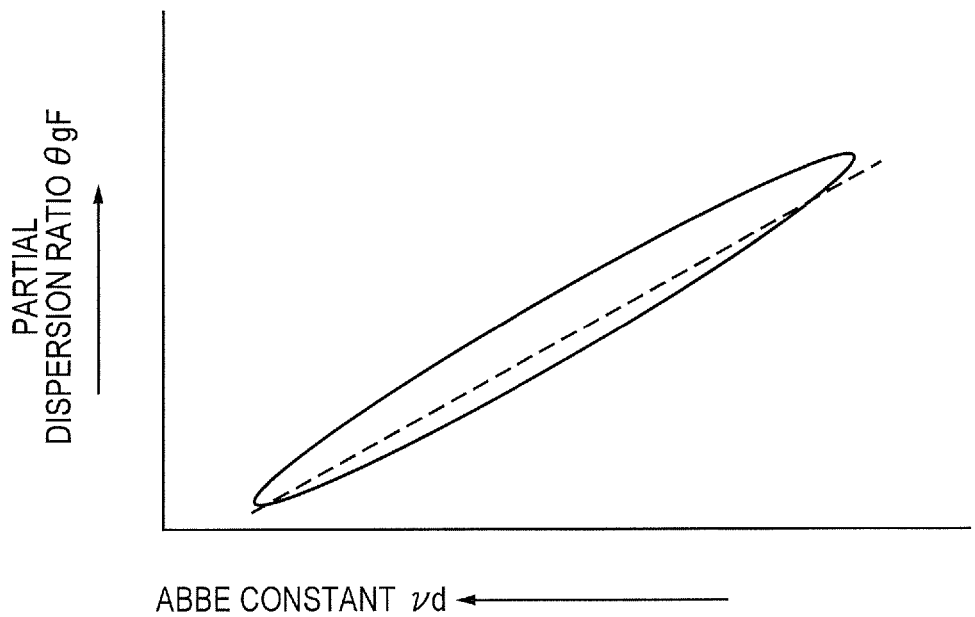
FIG. 14 is a schematic diagram of a distribution of an Abbe constant νd and a partial dispersion ratio θgF.

As illustrated in FIG. 14, existing optical materials are distributed in a narrow range of the partial dispersion ratio $\theta gF$ with respect to $\theta d$, and there is a tendency that $\theta gF$ is larger as $\nu d$ is smaller.

A thin contact optical system is constituted of two lenses Gp and Gn having predetermined refractive power $\Phi$ of positive refractive power $\Phi p$ and negative refractive power $\Phi n$, Abbe constants $\nu p$ and $\nu n$, an incident height h of the axial paraxial ray, and an incident height H of the pupil paraxial ray. Then, an axial chromatic aberration coefficient L and a lateral chromatic aberration coefficient T of the thin contact optical system are expressed by the following expressions.

$$L = h \times h \times (\Phi p/\nu p + \Phi n/\Phi n) \quad (5)$$

$$T = h \times H \times (\Phi p/\nu p + \Phi n/\nu n) \quad (6)$$

Here, the following expression is satisfied.

$$\Phi = \Phi p + \Phi n \quad (7)$$

Refractive power of each lens of the expressions (5) and (6) is normalized so that the expression (7) becomes "$\Phi = 1$". A case where the thin contact optical system is constituted of three or more lenses can be considered in the same manner. In the expressions (5) and (6), if L=0 and T=0 are satisfied, imaging positions of the C-line and the F-line on the axis and on the image plane are the same. In particular, in a zoom lens having high magnification, in order to suppress chromatic aberration variation due to magnification-varying, chromatic aberration of each lens unit, namely L and T are corrected to be approximately zero or close to zero.

In this case, a deviation amount of the axial chromatic aberration and a deviation amount of the lateral chromatic aberration of the g-line with respect to the F-line in a case where rays enter from an object at infinity are respectively defined as a secondary spectrum amount $\Delta s$ of the axial chromatic aberration and a secondary spectrum amount $\Delta y$ of the lateral chromatic aberration, which are expressed by the following expressions.

$$\Delta s = -h \times h \times (\theta p - \theta n)/(\nu p - \nu n) \times f \quad (8)$$

$$\Delta y = -h \times H \times (\theta p - \theta n)/(\nu p - \nu n) \times Y \quad (9)$$

Here, f represents a focal length of the entire lens system, and Y represents an image height.

Figure 15:
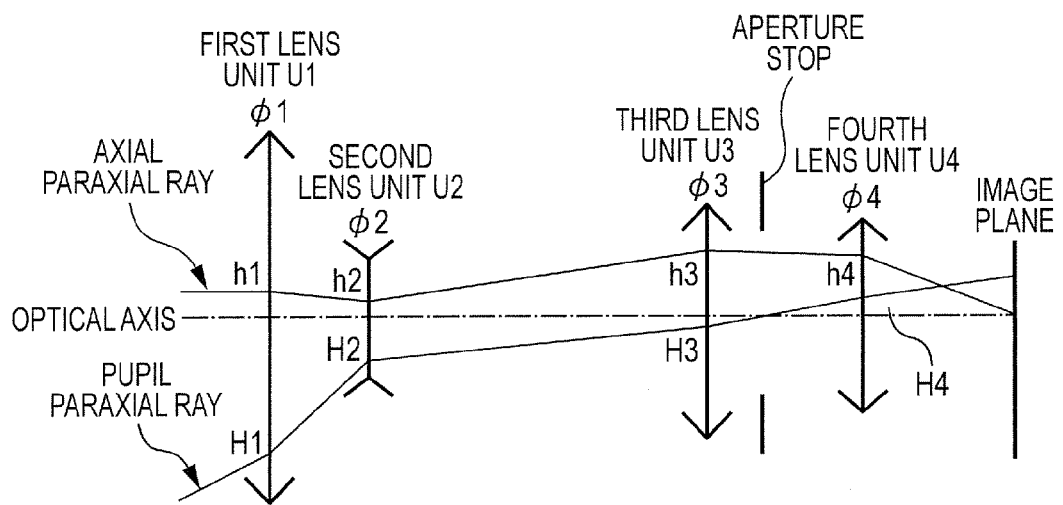
FIG. 15 is a schematic diagram of paraxial tracing at the wide angle end of a four-unit zoom lens in which a third lens unit has positive refractive power according to the present invention.
Figure 16:
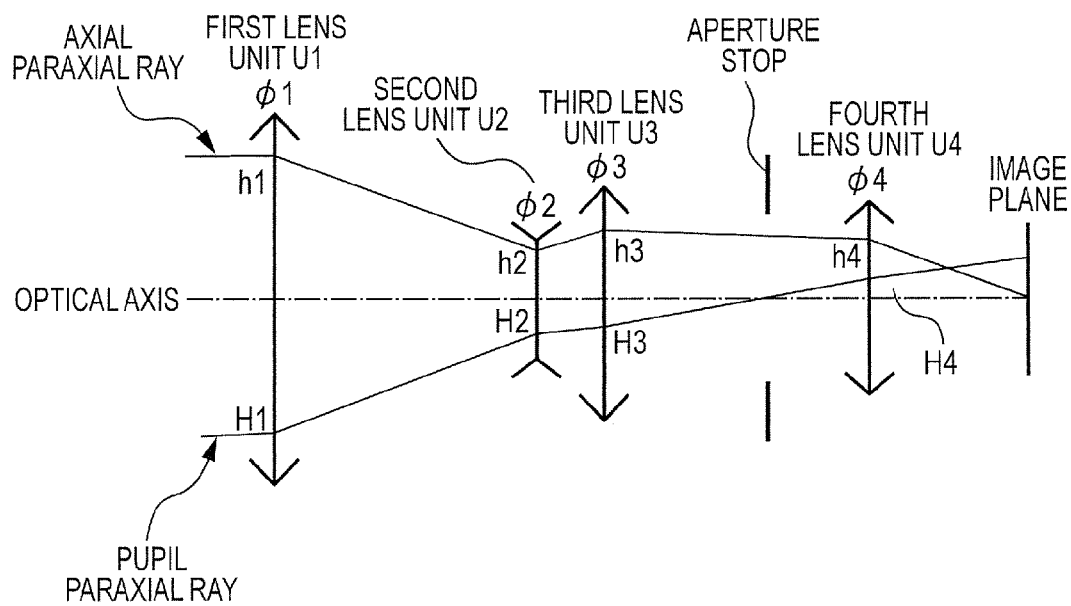
FIG. 16 is a schematic diagram of paraxial tracing at the telephoto end of the four-unit zoom lens in which the third lens unit has positive refractive power according to the present invention.

FIGS. 15 and 16 illustrate schematic diagrams of paraxial tracing at the wide angle end and at a telephoto end of a four-unit zoom lens in which the third lens unit U3 has positive refractive power according to this embodiment. In FIGS. 15 and 16, each lens unit is illustrated as a thin lens. As illustrated in FIGS. 15 and 16, a thin optical system is constituted of four thin contact lens units like the four-unit zoom lens of this embodiment having predetermined refractive power $\Phi$, in which axial and lateral chromatic aberrations of the C-line and the F-line are corrected for each lens unit. Then, secondary spectrum amounts $\Delta S$ and $\Delta Y$ of the axial chromatic aberration and the lateral chromatic aberration of the thin optical system are expressed by the following expressions.

$$\begin{aligned}\Delta S = \{&-h1 \times h1 \times (\theta 1p - \theta 1n)/(\nu 1p - \nu 1n) \times \Phi 1 \\&-h2 \times h2 \times (\theta 2p - \theta 2n)/(\nu 2p - \nu 2n) \times \Phi 2 \\&-h3 \times h3 \times (\theta 3p - \theta 3n)/(\nu 3p - \nu 3n) \times \Phi 3 \\&-h4 \times h4 \times (\theta 4p - \theta 4n)/(\nu 4p - \nu 4n) \times \Phi 4\} \times f\end{aligned} \quad (10)$$

$$\begin{aligned}\Delta Y = \{&-h1 \times H1 \times (\theta 1p - \theta 1n)/(\nu 1p - \nu 1n) \times \Phi 1 \\&-h2 \times H2 \times (\theta 2p - \theta 2n)/(\nu 2p - \nu 2n) \times \Phi 2 \\&-h3 \times H3 \times (\theta 3p - \theta 3n)/(\nu 3p - \nu 3n) \times \Phi 3 \\&-h4 \times H4 \times (\theta 4p - \theta 4n)/(\nu 4p - \nu 4n) \times \Phi 4\} \times Y\end{aligned} \quad (11)$$

Here, the following expression is satisfied.

$$\begin{aligned}\Phi = \ &\Phi 1 + \Phi 2 + \Phi 3 + \Phi 4 \\&-e1_{gap} \times \Phi 1 \times (\Phi 2 + \Phi 3 + \Phi 4) \\&-e2_{gap} \times (\Phi 3 + \Phi 4) \times (\Phi 1 + \Phi 2 - e1_{gap} \times \Phi 1 \times \Phi 2) \\&-e3_{gap} \times \Phi 4 \times \{\Phi 1 + \Phi 2 + \Phi 3 - e1_{gap} \times \Phi 1 \times (\Phi 2 + \Phi 3) \\&-e2_{gap} \times \Phi 3 \times (\Phi 1 + \Phi 2) + e1_{gap} \times e2_{gap} \times \Phi 1 \times \Phi 2 \times \Phi 3\}\end{aligned} \quad (12)$$

Further, f represents a focal length of the entire lens system and Y represents an image height. Further, h1, h2, h3, and h4 represent incident heights of the axial paraxial ray of the first lens unit, the second lens unit, the third lens unit, and the fourth lens unit, and H1, H2, H3, and H4 represent incident heights of the pupil paraxial ray of the first lens unit, the second lens unit, the third lens unit, and the fourth lens unit. Further, $\theta 1p$, $\theta 2p$, $\theta 3p$, and $\theta 4p$ represent average partial dispersion ratios of lenses having positive refractive power of the first lens unit, the second lens unit, the third lens unit, and the fourth lens unit. Further, $\theta 1n$, $\theta 2n$, $\theta 3n$, and $\theta 4n$ represent average partial dispersion ratios of lenses having negative refractive power of the first lens unit, the second lens unit, the third lens unit, and the fourth lens unit. Further, $\nu 1p$, $\nu 2p$, $\nu 3p$, and $\nu 4p$ represent average dispersions of lenses having positive refractive power of the first lens unit, the second lens unit, the third lens unit, and the fourth lens unit, and $\nu 1n$, $\nu 2n$, $\nu 3n$, and $\nu 4n$ represent average dispersions of lenses having negative refractive power of the first lens unit, the second lens unit, the third lens unit, and the fourth lens unit. Further, $\Phi 1$, $\Phi 2$, $\Phi 3$, and $\Phi 4$ represent refractive powers of the first lens unit, the second lens unit, the third lens unit, and the fourth lens unit. Further, $e1_{gap}$, $e2_{gap}$, and $e3_{gap}$ represent intervals on the optical axis between the first lens unit and the second lens unit, between the second lens unit and the third lens unit, and between the third lens unit and the fourth lens unit. Refractive power of each lens unit of the expressions (10) and (11) is normalized so that the expression (12) becomes "$\Phi = 1$". A case where the lens unit is constituted of five or more lens units can be considered in the same manner.

Figure 12:
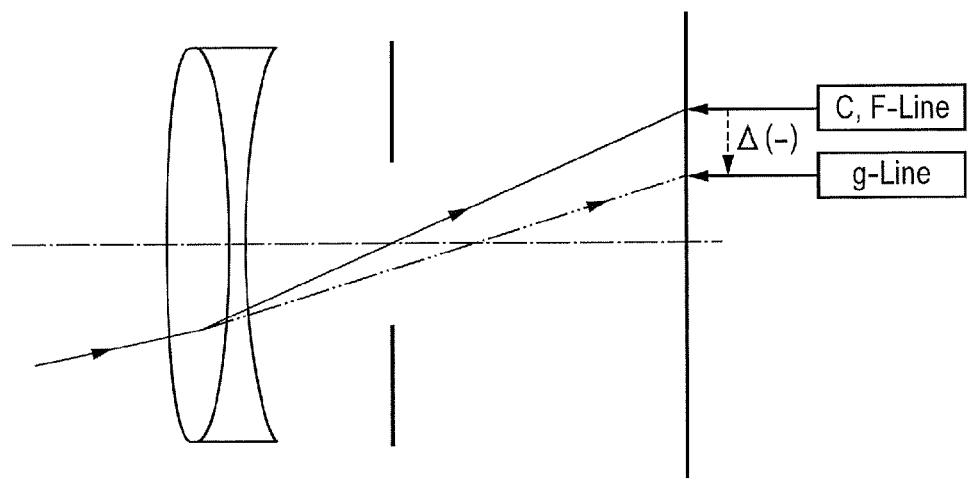
FIG. 12 is a schematic diagram illustrating achromatism of lateral chromatic aberration with respect to two colors and residual secondary spectrum in a lens unit having positive refractive power.

In FIG. 14, for achromatism in a lens unit Lp having positive refractive power, a material having a large Abbe constant $\nu p$ is used for the positive lens Gp, and a material having a small Abbe constant $\nu n$ is used for the negative lens Gn. Therefore, from the expression (11), the positive lens Gp has a small value of $\theta p$, while the negative lens Gn has a large value of $\theta n$. When the chromatic aberration is corrected on the F-line and the C-line, if the lens unit Lp having positive refractive power is located closer to the object side than the aperture stop as illustrated in FIG. 12, an imaging point of the g-line is deviated to a low image height area in off-axis. The secondary spectrum amounts ΔS and ΔY are generated greatly in the first lens unit U1 of this embodiment, through which the axial paraxial ray and the pupil paraxial ray pass at a high incident height at telephoto side as illustrated in FIG. 16. The same is true in the four-unit zoom lens of this embodiment, in which the third lens unit U3 has negative refractive power.

Figure 13:
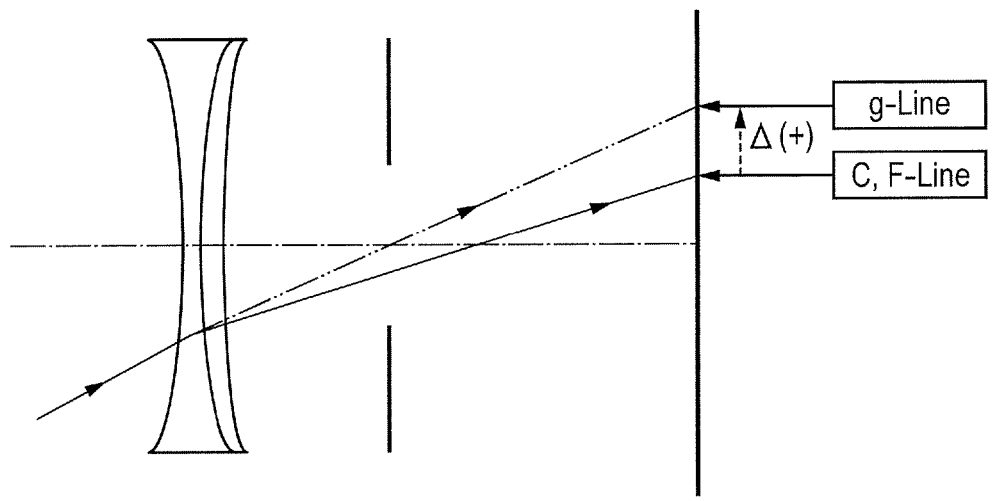
FIG. 13 is a schematic diagram illustrating achromatism of lateral chromatic aberration with respect to two colors and residual secondary spectrum in a lens unit having negative refractive power.

In FIG. 14, for achromatism in a lens unit Ln having negative refractive power, a material having a small Abbe constant ν1 is used for the positive lens G1, and a material having a large Abbe constant ν2 is used for the negative lens G2. Therefore, from the expression (11), the positive lens G1 has a large value of θ1, while the negative lens G2 has a small value of θ2. When the chromatic aberration is corrected on the F-line and the C-line, if the lens unit Ln having negative refractive power is located closer to the object side than the aperture stop as illustrated in FIG. 13, an imaging point of the g-line is deviated to a high image height area in off-axis. As illustrated in FIG. 16, this phenomenon occurs in the second lens unit U2 having negative refractive power in the four-unit zoom lens of this embodiment. The same is true in the four-unit zoom lens of this embodiment, in which the third lens unit U3 has negative refractive power.

Therefore, the first term is negative while the second term is positive in the expression (11). Thus, by increasing the absolute value of the secondary spectrum amount of the lateral chromatic aberration generated in the second lens unit U2, it is possible to effectively correct the secondary spectrum amount of the lateral chromatic aberration generated in the first lens unit U1.

Further, by using a difference of the incident height of the pupil paraxial ray between lens units at the telephoto end, it is possible to effectively correct the secondary spectrum amount of the lateral chromatic aberration at the telephoto end. In this embodiment, the secondary spectrum of the lateral chromatic aberration at the telephoto end is effectively corrected, by appropriately selecting the Abbe constant, the partial dispersion ratio, and the refractive power of the positive lens and the negative lens in the front first lens unit U11 in which the incident height of the pupil paraxial ray at the telephoto end becomes higher. Thus, variations of the secondary spectrum of the lateral chromatic aberration at the wide angle end and at the telephoto end are effectively corrected. In addition, by appropriately selecting the Abbe constant, the partial dispersion ratio, and the refractive power of the positive lens and the negative lens in the second lens unit U2 in which the incident height of the pupil paraxial ray at the telephoto end becomes lower, the secondary spectrum of the axial chromatic aberration at the telephoto end, which is excessively corrected in the front first lens unit U11, is effectively corrected.

In the following, variation correction of the secondary spectrum of the lateral chromatic aberration at the wide angle end and at the telephoto end in the front first lens unit U11 and the second lens unit U2 of the four-unit zoom lens of the present invention is described in detail.

Here, the axial chromatic aberration coefficient L and the lateral chromatic aberration coefficient T of the entire lens system constituted of three or more lenses are given by the following expressions (13) and (14).

$$L = \Sigma(h\_j \times h\_j \times \phi\_j / \nu\_j) \quad (13)$$

$$T = \Sigma(h\_j \times H\_j \times \phi\_j / \nu\_j) \quad (14)$$

Here, $h\_j$ and $H\_j$ respectively represent the incident height of the axial paraxial ray and the incident height of the pupil paraxial ray in paraxial tracing of the j-th lens from the object side. In addition, $\phi\_j$ and $\nu\_j$ respectively represent the refractive power and the Abbe constant of the j-th lens from the object side.

Further, an axial chromatic aberration amount Δf and a lateral chromatic aberration amount ΔY of the entire lens system are given by the following expressions (15) and (16).

$$\Delta f = -L \times f \quad (15)$$

$$\Delta Y = -T \times Y \quad (16)$$

Here, f represents the focal length of the entire lens system, and Y represents the image height of the entire lens system.

Assuming that the denominator (partial dispersion) of the Abbe constant $\nu\_j$ used in the expressions (13) and (14) is ng−nF, the expressions (13) and (14) respectively express the axial chromatic aberration coefficient and the lateral chromatic aberration coefficient of the g-line with respect to the F-line. The expressions (15) and (16) respectively express the secondary spectrum amount of the axial chromatic aberration and the secondary spectrum amount of the lateral chromatic aberration. From the expressions (13) and (15), a sharing value of the secondary spectrum of the axial chromatic aberration shared by each lens increases in proportion to the square of the height of the axial paraxial ray, the refractive power of the lens, and a refractive index difference between the g-line and the F-line. In contrast, from the expressions (14) and (16), a sharing value of the secondary spectrum of the lateral chromatic aberration shared by each lens increases in proportion to the height of the axial paraxial ray, the height of the pupil paraxial ray, the refractive power of the lens, and the refractive index difference between the g-line and the F-line.

Here, from the expressions (13) and (14), a ratio TL\_j of the lateral chromatic aberration coefficient of the secondary spectrum to the axial chromatic aberration coefficient of the secondary spectrum of the j-th lens from the object side is determined by the following expression (17).

$$TL\_j = H\_j / h\_j \quad (17)$$

In the lens located closer to the object side than the aperture stop, TL\_j always has a negative value. From the expression (17), as the lens has a higher position of the incident height of the pupil paraxial ray, the sharing value of the lateral chromatic aberration coefficient of the secondary spectrum is larger, and hence it is more advantageous for correcting the secondary spectrum of the lateral chromatic aberration. On the contrary, as the lens has a lower position of the incident height of the pupil paraxial ray, the sharing value of the axial chromatic aberration coefficient of the secondary spectrum is larger, and hence it is more advantageous for correcting the secondary spectrum of the axial chromatic aberration. In the four-unit zoom lens of this embodiment, as the lens is located closer to the object side, the incident height of the pupil paraxial ray tends to be high, and hence it is more advantageous for correcting the secondary spectrum of the lateral chromatic aberration.

Further, from the expressions (13) and (14), a ratio TzLz\_j of a lateral chromatic aberration coefficient difference of the secondary spectrum between the wide angle end and the telephoto end to an axial chromatic aberration coefficient difference of the secondary spectrum between the wide angle end and the telephoto end in the j-th lens from the object side is determined by the following expression (18).

$$TzLz\_j = (hT\_j \times HT\_j - hW\_j \times HW\_j)/(hT\_j \times hT\_j - hW\_j \times hW\_j) \quad (18)$$

Here, hW_j and HW_j respectively represent the incident height of the axial paraxial ray at the wide angle end and the incident height of the pupil paraxial ray at the wide angle end in paraxial tracing of the j-th lens from the object side. Further, hT_j and HT_j respectively represent the incident height of the axial paraxial ray at the telephoto end and the incident height of the pupil paraxial ray at the telephoto end in paraxial tracing of the j-th lens from the object side.

Figure 17:
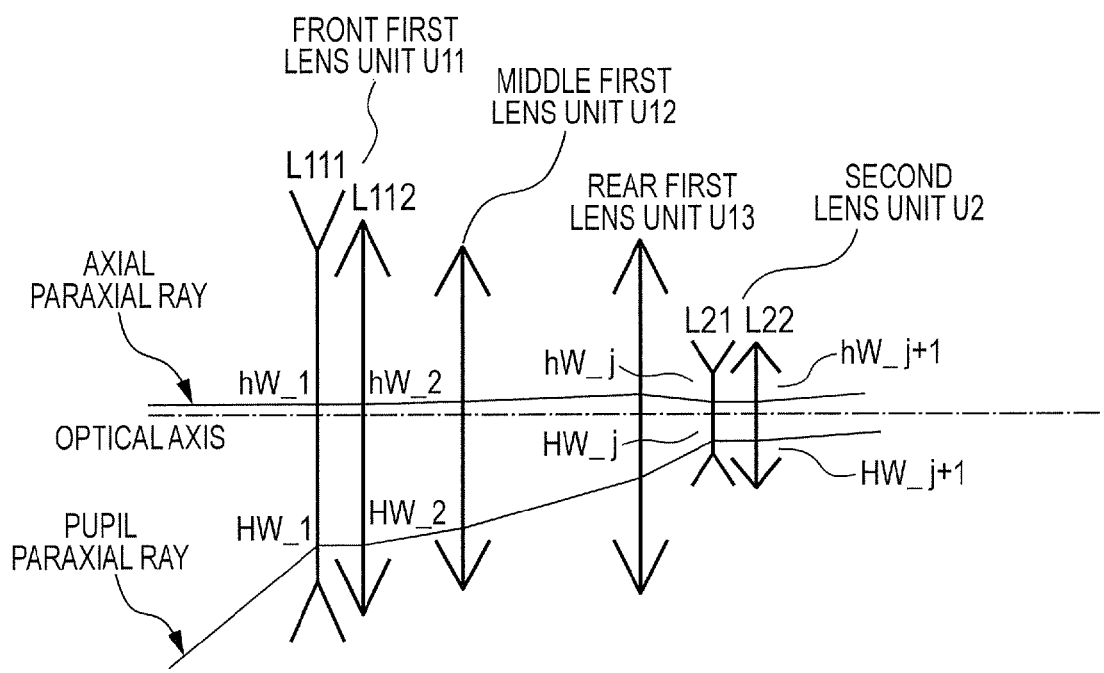
FIG. 17 is a schematic diagram of paraxial tracing at the wide angle end of a first lens unit and a second lens unit in the four-unit zoom lens in which the third lens unit has positive refractive power according to the present invention.
Figure 18:
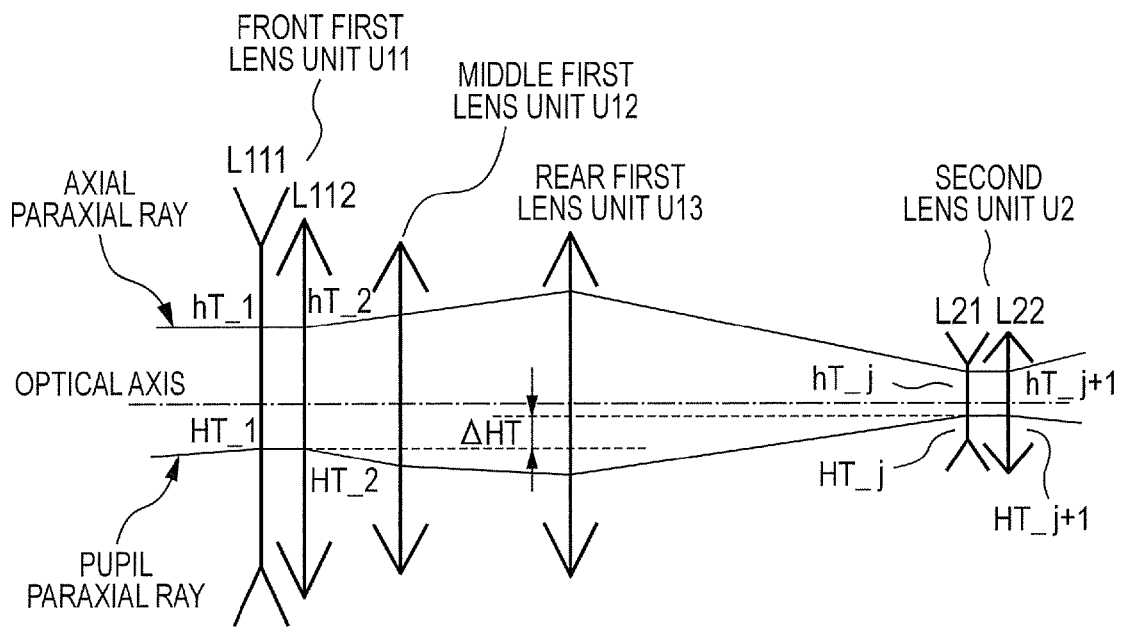
FIG. 18 is a schematic diagram of paraxial tracing at the telephoto end of the first lens unit and the second lens unit in the four-unit zoom lens in which the third lens unit has positive refractive power according to the present invention.

FIGS. 17 and 18 illustrate schematic diagrams of paraxial tracing at the wide angle end and at the telephoto end of the front first lens unit U11 including, in order from the object side, a lens L111 and a lens L112, and the second lens unit U2 including, in order from the object side, a lens L21 and a lens L22, of the four-unit zoom lens in which the third lens unit has positive refractive power, according to this embodiment.

As to the front first lens unit U11 and the second lens unit U2 illustrated in FIGS. 17 and 18, the lenses L111 and L21 are negative lenses while the lenses L112 and L22 are positive lenses in order to correct chromatic aberration by the lenses L111 and L112, and by the lenses L21 and L22. In addition, the lenses L111 and L112, and the lenses L21 and L22 have the same incident height of the axial paraxial ray and the pupil paraxial ray when assuming that each of the lenses is a thin contact lens.

In particular, in the front first lens unit U11 of the zoom lens having a high zoom ratio, as illustrated in FIGS. 17 and 18, the incident heights hT_1 and HT_1 of the axial paraxial ray and the pupil paraxial ray at the telephoto end become large and dominant in determining the value of the expression (18). The denominator in the expression (18) has a positive value. Therefore, as the lens located in the front first lens unit U11 has a higher incident height of the pupil paraxial ray at the telephoto end, the value of the expression (18) tends to be larger in negative.

Therefore, by selecting the Abbe constant, the partial dispersion ratio, and the refractive power of glass material advantageous for correcting the secondary spectrum of the chromatic aberration in the lenses L111 and L112 so as to correct the secondary spectrum of the lateral chromatic aberration at the telephoto end, variations of the secondary spectrum of the lateral chromatic aberration at the wide angle end and at the telephoto end can be effectively corrected.

In contrast, as illustrated in FIG. 18, the incident height of the pupil paraxial ray at the telephoto end is lower in the lenses L21 and L22 than in the lenses L111 and L112 by ΔHT (=|HT_1−HT_j|).

Therefore, by appropriately selecting the Abbe constant and the partial dispersion ratio of the glass material of the lenses L21 and L22 and the refractive power of the lenses L21 and L22, it is possible to suppress deterioration of the secondary spectrum of the lateral chromatic aberration at the telephoto end to be a minimum value. In addition, the secondary spectrum of the axial chromatic aberration at the telephoto end, which is excessively corrected in the lenses L111 and L112, can be effectively corrected. The same is true in the four-unit zoom lens of this embodiment, in which the third lens unit U3 has negative refractive power.

Note that, in order that the front first lens unit U11 and the second lens unit U2 have appropriate negative refractive power, each of the front first lens unit U11 and the second lens unit U2 is constituted of at least two lenses having negative refractive power.

In view of the above discussion, each of the front first lens unit U11 and the second lens unit U2 in the four-unit zoom lens of this example is constituted of at least one lens having positive refractive power and at least two lenses having negative refractive power.

Similarly to the expression (18), a ratio TzLz_i of a sharing value difference of the lateral chromatic aberration coefficient of the secondary spectrum between the wide angle end and the telephoto end to a sharing value difference of the axial chromatic aberration coefficient of the secondary spectrum between the wide angle end and the telephoto end in the i-th lens from the object side is determined by the following the expression (19).

$$TzLz\_i = (hT\_i \times HT\_i - hW\_i \times HW\_i)/(hT\_i \times hT\_i - hW\_i \times hW\_i) \quad (19)$$

Here, hW_i and HW_i respectively represent the incident height of the axial paraxial ray at the wide angle end and the incident height of the pupil paraxial ray at the wide angle end in the paraxial tracing of the i-th lens from the object side. In addition, hT_i and HT_i respectively represent the incident height of the axial paraxial ray at the telephoto end and the incident height of the pupil paraxial ray at the telephoto end in the paraxial tracing of the i-th lens from the object side.

In view of the above discussion, the conditional expressions (1) and (2) appropriately set the conditions of Abbe constants and partial dispersion ratios of materials and refractive powers of the positive lenses and the negative lenses in the front first lens unit U11, which can more effectively correct the variations of the secondary spectrum of the lateral chromatic aberration at the wide angle end and at the telephoto end.

The conditional expression (1) defines Abbe constants and partial dispersion ratios of materials of the positive lenses and the negative lenses in the front first lens unit U11.

If the upper limit condition of the conditional expression (1) is not satisfied, the effect of correcting the secondary spectrum in the front first lens unit U11 is insufficient, and hence the zoom variation of the secondary spectrum of the lateral chromatic aberration cannot be appropriately corrected, which is not good.

Here, the combined focal length fx of multiple lenses is determined by the expression (20):

$$\frac{1}{fx} = \frac{1}{f1} + \frac{1}{f2} + \frac{1}{f3} + \ldots \quad (20)$$

where f1, f2, f3, and so on represent focal lengths of the multiple lenses.

The conditional expression (2) defines the combined focal length of positive lenses in the front first lens unit U11.

If the upper limit condition of the conditional expression (2) is not satisfied, power of each lens in the front first lens unit U11 becomes too large, and hence high order aberrations are apt to occur, which is not good.

If the lower limit condition of the conditional expression (2) is not satisfied, power of each lens in the front first lens unit U11 becomes small, and hence the effect of correcting the secondary spectrum in the front first lens unit U11 becomes insufficient. As a result, the zoom variation of the secondary spectrum of the lateral chromatic aberration cannot be appropriately corrected, which is not good. Simultaneously, in order to keep a short focal length of the entire system, it is necessary to dispose the lenses with sufficient intervals. As a result, the entire length of the lens system is elongated, which is not good.

It is more preferred to set the conditional expression (2) as follows.

$$-7.0 < f11cp/f11 < -2.5 \quad (2a)$$

In each example, it is more preferred to satisfy the following conditional expression.

$$5.0 < v11n - v11p < 50.0 \quad (3)$$

The conditional expression (3) defines an Abbe constant difference between the positive lens and the negative lens of the front first lens unit.

If the upper limit condition of the conditional expression (3) is not satisfied, the Abbe constant difference between the positive lens and the negative lens of the front first lens unit becomes large. As a result, power of each lens in the front first lens unit U11 becomes small if a predetermined chromatic aberration coefficient is shared. Therefore, the effect of correcting the secondary spectrum in the front first lens unit U11 is insufficient, and hence it becomes difficult to appropriately correct the variation of the secondary spectrum of the lateral chromatic aberration depending on zooming, which is not good. Simultaneously, in order to keep a short focal length of the entire system, it is necessary to dispose the lenses with sufficient intervals. As a result, the entire length of the lens system is elongated, which is not good.

If the lower limit condition of the conditional expression (3) is not satisfied, the Abbe constant difference between the positive lens and the negative lens of the front first lens unit becomes small. As a result, power of each lens in the front first lens unit U11 becomes too large, and hence high order aberrations are apt to occur, which is not good.

It is more preferred to set the conditional expression (3) as follows.

$$15.0 < v11n - v11p < 40.0 \quad (3a)$$

Here, focal lengths of the four-unit zoom lens are expressed by the following expressions.

$$fW = f1 \times \beta 2W \times \beta 3W \times \beta 4 \quad (21\text{-}1)$$

$$fT = f1 \times \beta 2T \times \beta 3T \times \beta 4 \quad (21\text{-}2)$$

$$Z = fT/fW = \beta 2W/\beta 2T \times \beta 3W/\beta 3T \quad (21\text{-}3)$$

Here, fW represents a focal length of the entire system at the wide angle end, fT represents a focal length of the entire system at the telephoto end, f1 represents a focal length of the first lens unit U1 in focus at infinity, β2W represents an imaging magnification of the second lens unit U2 at the wide angle end, β3W represents an imaging magnification of the third lens unit U3 at the wide angle end, β2T represents an imaging magnification of the second lens unit U2 at the telephoto end, 33T represents an imaging magnification of the third lens unit U3 at the telephoto end, β4 represents an imaging magnification of the fourth lens unit U4, and Z represents a zoom ratio. The imaging magnification of the second lens unit U2 that contributes to the magnification-varying is expressed by the following expressions.

$$\beta 2W = f2/(f1 - e1 + f2) \quad (22\text{-}1)$$

$$\beta 2T = f2/(f1 - e1 - mv + f2) \quad (22\text{-}2)$$

Here, f2 represents a focal length of the second lens unit U2, e1 represents an interval between principal points of the first lens unit U1 and the second lens unit U2, and m2 represents a movement amount of the second lens unit U2 from the wide angle end to the telephoto end.

In addition, the imaging magnification of the fourth lens unit U4 is expressed by the following expression.

$$\beta 4 = S_{rear}/S_{front} \quad (23)$$

Here, $S_{front}$ represents a distance from the object point of the fourth lens unit U4 to the front principal point position of the fourth lens unit U4, and $S_{rear}$ represents a distance from the image point of the fourth lens unit U4 to the rear principal point position of the fourth lens unit U4.

In order to achieve a larger angle of field, a larger diameter, higher performance, and a smaller size and lighter weight of the zoom lens, it is necessary to appropriately set the above-mentioned parameters f1, β2W, β3W, and β4 in the expression (21-1).

Figure 19:
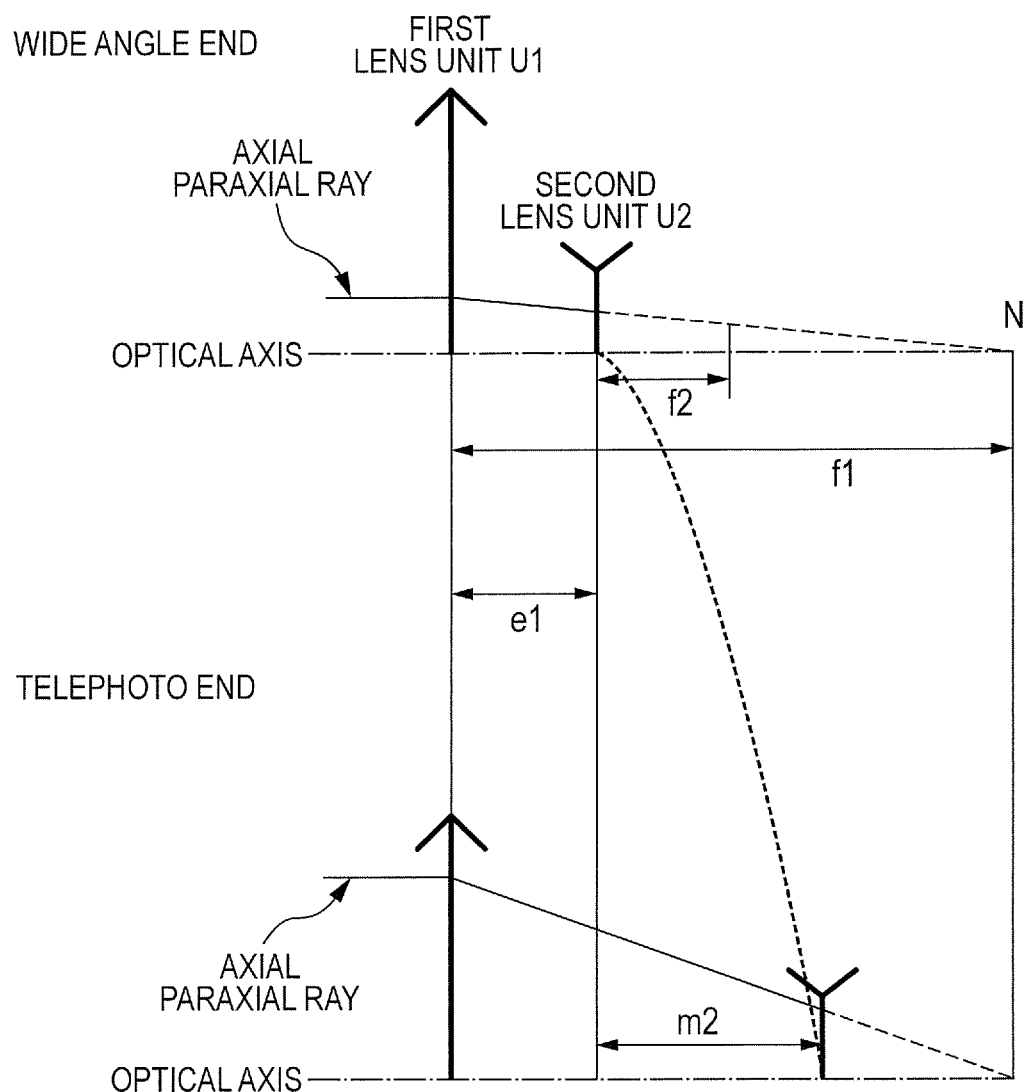
FIG. 19 is a schematic diagram of an optical layout at the wide angle end and at the telephoto end in the first lens unit and the second lens unit of the four-unit zoom lens according to the present invention.

FIG. 19 illustrates a schematic diagram of an optical layout of the first lens unit U1 and the second lens unit U2 at the wide angle end and at the telephoto end. In addition, e1 represents an interval between principal points of the first lens unit U1 and the second lens unit U2, and N represents an object point position of the second lens unit U2 (image point position of the first lens unit U1).

In each embodiment, it is more preferred to satisfy the following condition.

$$1.0 < fT/f1 < 5.0 \quad (4)$$

The conditional expression (4) defines a ratio between the focal length of the first lens unit U1 in focus at infinity and the focal length of the entire system at the telephoto end, so as to define a condition for achieving both the higher magnification and higher performance.

If the upper limit condition of the conditional expression (4) is not satisfied, the object point position N of the second lens unit U2 becomes distant as illustrated in FIG. 19. Therefore, from the expression (22-2), the movement amount of the second lens unit U2 due to magnification-varying increases, and hence a size of the entire lens system increases.

If the lower limit condition of the conditional expression (4) is not satisfied, an enlargement ratio by a magnification-varying lens unit of the spherical aberration and the axial chromatic aberration generated in the first lens unit U1 at the telephoto end increases, and hence it becomes difficult to achieve higher performance.

It is more preferred to set the conditional expression (4) as follows.

$$1.1 < fT/f1 < 4.0 \quad (4a)$$

In each embodiment, it is more preferred to satisfy the following condition:

$$-7.5 \times 10^{-4} \times fT/f1 - 2.0 \times 10^{-3} < (\theta 2p - \theta 2n)/(v2p - v2n) \quad (5)$$

where v2p and θ2p respectively represent the average value of the Abbe constants and the average value of the partial dispersion ratios of materials of the positive lenses in the second lens unit, and v2n and θ2n respectively represent the average value of the Abbe constants and the average value of the partial dispersion ratios of materials of negative lenses in the second lens unit.

In the second lens unit U2, the Abbe constants and the partial dispersion ratios of glass materials of the positive lenses and the negative lenses, and the refractive powers are appropriately selected, and hence the deterioration of the secondary spectrum of the lateral chromatic aberration at the telephoto end is minimized, and the secondary spectrum of the axial chromatic aberration at the telephoto end, which is excessively corrected in the front first lens unit U11, is effectively corrected. However, as the enlargement ratio fT/f1 of the second lens unit U2 as the magnification-varying lens unit and the subsequent lens units becomes larger, it becomes difficult to correct the secondary spectrum of the chromatic aberration at the telephoto end. Therefore, it is necessary to constitute the positive lenses and the negative lenses in the second lens unit U2 of materials having Abbe constants and partial dispersion ratios that are more effective for correcting the secondary spectrum of the chromatic aberration.

The conditional expression (5) defines the Abbe constant and the partial dispersion ratio of the material of the positive lens and the negative lens in the second lens unit U2 with respect to the enlargement ratio fT/f1 of the second lens unit as the magnification-varying lens unit and the subsequent lens units at the telephoto end.

If the conditional expression (5) is not satisfied, the secondary spectrum correction sharing value of the chromatic aberration in the second lens unit U2 becomes excessive. Therefore, the secondary spectrum correction sharing value of the chromatic aberration in the first lens unit U1 is small, and hence it becomes difficult to appropriately correct the zoom variation of the secondary spectrum of the lateral chromatic aberration, which is not good.

The front first lens unit U11 and the second lens unit U2 correct the variations of the secondary spectrum of the lateral chromatic aberration at the wide angle end and at the telephoto end. In addition, the fourth lens unit U4 further corrects the secondary spectrum of the lateral chromatic aberration at the wide angle end, and hence the secondary spectrum of the lateral chromatic aberration can be more appropriately corrected over the entire zoom range.

In the four-unit zoom lens of the present invention, if the third lens unit U3 has positive refractive power, the fourth lens unit U4 includes, in order from the object side, a front fourth lens unit U41 having negative refractive power, a middle fourth lens unit U42 that is a magnification-varying lens unit inserted into or removed from the optical path so as to change a focal length range of the entire system, and a rear fourth lens unit U43 having positive refractive power.

In the four-unit zoom lens of the present invention, if the third lens unit U3 has negative refractive power, the fourth lens unit U4 includes, with respect to a largest air interval as a boundary, a front fourth lens unit U4a having positive refractive power and a rear fourth lens unit U4b having positive refractive power.

FIG. 15 illustrates a schematic diagram of paraxial tracing at the wide angle end of the four-unit zoom lens in which the third lens unit U3 has positive refractive power according to the present invention. As illustrated in FIG. 15, as the lens is closer to the image side in the fourth lens unit U4, the incident height of the pupil paraxial ray is higher, and hence the secondary spectrum of the lateral chromatic aberration at the wide angle end can be more effectively corrected. In contrast, as illustrated in FIG. 15, as the lens is closer to the object side in the fourth lens unit U4, the incident height of the pupil paraxial ray is lower, and hence the secondary spectrum of the axial chromatic aberration at the wide angle end can be more effectively corrected. Therefore, the secondary spectrum of the lateral chromatic aberration at the wide angle end is corrected by the lens unit located closer to the image side in the fourth lens unit U4, and the secondary spectrum of the axial chromatic aberration at the wide angle end, which is excessively corrected, is corrected by the lens unit located closer to the object side in the fourth lens unit U4. The same is true in the four-unit zoom lens of this embodiment, in which the third lens unit U3 has negative refractive power.

In each embodiment of the zoom lens of the present invention, in which the third lens unit U3 of the four-unit zoom lens has positive refractive power, it is more preferred to satisfy the following condition.

$$2.0 < \frac{\left(\frac{\theta 42p - \theta 42n}{\nu 42p - \nu 42n}\right)}{\left(\frac{\theta 43p - \theta 43n}{\nu 43p - \nu 43n}\right)} < 4.0 \qquad (6)$$

Here, ν42p and θ42p represent the average value of the Abbe constants and the average value of the partial dispersion ratios of materials of positive lenses in the middle fourth lens unit U42, and ν42n and θ42n represent the average value of the Abbe constants and the average value of the partial dispersion ratios of materials of negative lenses in the middle fourth lens unit U42. In addition, ν43p and θ43p represent the average value of the Abbe constants and the average value of the partial dispersion ratios of materials of positive lenses in the rear fourth lens unit U43, and ν43n and θ43n represent the average value of the Abbe constants and the average value of the partial dispersion ratios of materials of negative lenses in the rear fourth lens unit U43.

The conditional expression (6) defines the Abbe constant and the partial dispersion ratio of materials of the positive lenses and the negative lenses in the middle fourth lens unit U42 and in the rear fourth lens unit U43, so as to define appropriate balance of the secondary spectrum correction of the axial and lateral chromatic aberrations at the wide angle end.

If the upper limit condition of the conditional expression (6) is not satisfied, the secondary spectrum of the chromatic aberration is excessively corrected in the rear fourth lens unit U43, and hence it becomes difficult to sufficiently correct the secondary spectrum of the axial chromatic aberration in the middle fourth lens unit U42. In particular, it becomes difficult to obtain a sufficient effect of correcting the axial chromatic aberration at the wide angle end of the entire optical system.

If the lower limit condition of the conditional expression (6) is not satisfied, the effect of correcting the secondary spectrum of the chromatic aberration in the rear fourth lens unit U43 becomes insufficient. In particular, it becomes difficult to obtain a sufficient effect of correcting the lateral chromatic aberration at the wide angle end of the entire optical system.

It is more preferred to set the conditional expression (6) as follows.

$$2.3 < \frac{\left(\frac{\theta 42p - \theta 42n}{\nu 42p - \nu 42n}\right)}{\left(\frac{\theta 43p - \theta 43n}{\nu 43p - \nu 43n}\right)} < 3.0 \qquad (6a)$$

In addition, because the front fourth lens unit U41 is located closer to the object side than the middle fourth lens unit U42, the incident height of the pupil paraxial ray becomes lower. Therefore, the secondary spectrum of the axial chromatic aberration at the wide angle end, which is excessively corrected by the rear fourth lens unit U43, can be more effectively corrected. However, when a focal length range of the entire system is changed by inserting or removing the middle fourth lens unit U42, the deterioration amount of the secondary spectrum of the axial chromatic aberration in the front fourth lens unit U41 is enlarged by the square of a magnification-varying ratio, which is not good.

In each example of the zoom lens of the present invention, in which the third lens unit U3 of the four-unit zoom lens has negative refractive power, it is more preferred to satisfy the following condition.

$$0.5 < \frac{\left(\frac{\theta 4ap - \theta 4an}{v4ap - v4an}\right)}{\left(\frac{\theta 4bp - \theta 4bn}{v4bp - v4bn}\right)} < 2.5 \quad (7)$$

Here, ν4ap and θ4ap represent the average value of the Abbe constants and the average value of the partial dispersion ratios of materials of positive lenses in the front fourth lens unit U4a, and ν4an and θ4an represent the average value of the Abbe constants and the average value of the partial dispersion ratios of materials of negative lenses in the front fourth lens unit U4a. In addition, ν4bp and θ4bp represent the average value of the Abbe constants and the average value of the partial dispersion ratios of materials of positive lenses in the rear fourth lens unit U4b, and ν4bn and θ54bn represent the average value of the Abbe constants and the average value of the partial dispersion ratios of materials of negative lenses in the rear fourth lens unit U4b.

The conditional expression (7) defines the Abbe constant and the partial dispersion ratio of materials of the positive lenses and the negative lenses in the front fourth lens unit U4a and in the rear fourth lens unit U4b, so as to define the appropriate balance of the secondary spectrum correction of the axial and lateral chromatic aberrations at the wide angle end.

If the upper limit condition of the conditional expression (7) is not satisfied, the secondary spectrum of the chromatic aberration is excessively corrected in the rear fourth lens unit U4b, and hence it becomes difficult to sufficiently correct the secondary spectrum of the axial chromatic aberration in the front fourth lens unit U4a. In particular, it becomes difficult to obtain a sufficient effect of correcting the axial chromatic aberration at the wide angle end of the entire optical system.

If the lower limit condition of the conditional expression (7) is not satisfied, the effect of correcting the secondary spectrum of the chromatic aberration in the rear fourth lens unit U4b becomes insufficient. In particular, it becomes difficult to obtain a sufficient effect of correcting the lateral chromatic aberration at the wide angle end of the entire optical system.

It is more preferred to set the conditional expression (7) as follows.

$$0.8 < \frac{\left(\frac{\theta 4ap - \theta 4an}{v4ap - v4an}\right)}{\left(\frac{\theta 4bp - \theta 4bn}{v4bp - v4bn}\right)} < 2.0 \quad (7a)$$

Next, among features of the lens structure of the zoom lens of each example, features other than described above are described below.

Embodiment 1

In the following, a lens structure according to Embodiment 1 of the present invention is described.

FIG. 1 is a lens cross-sectional view when an object at infinity is focused at a wide angle end of a zoom lens according to Embodiment 1 (Numerical Embodiment 1) of the present invention.

A first lens unit U1 has positive refractive power that is fixed during the magnification-varying. The first lens unit U1 includes, in order from the object side, the front first lens unit U11 having negative refractive power as a fixed lens unit, the middle first lens unit U12 having positive refractive power as a focus lens unit, and the rear first lens unit U13 having positive refractive power as a fixed lens unit. A second lens unit U2 (variator lens unit) has negative refractive power for varying magnification and moves to the image side during magnification-varying from the wide angle end (short focal length end) to a telephoto end (long focal length end). A third lens unit U3 (compensator lens unit) has negative refractive power and moves non-linearly on the optical axis in synchronization with movement of the second lens unit U2 so as to correct the image plane variation due to magnification-varying. An aperture stop SP does not move during magnification-varying and is disposed on the image side of the third lens unit U3. A fourth lens unit U4 (relay lens unit) has positive refractive power and does not move for varying magnification. The fourth lens unit U4 includes, with respect to a largest air interval as a boundary, the front fourth lens unit U4a having positive refractive power and the rear fourth lens unit U4b having positive refractive power.

A glass block P is a color separation prism or an optical filter. An image plane IP corresponds to an image pickup plane of a solid-state image pickup element (photoelectric transducer).

The front first lens unit U11 of Numerical Embodiment 1 is constituted of one positive lens and two negative lenses and includes, in order from the object side, a negative lens, a negative lens, and a positive lens. The second lens unit U2 of Numerical Embodiment 1 is constituted of two positive lenses and two negative lenses and includes, in order from the object side, a negative lens, a cemented lens of a positive lens and a negative lens, and a positive lens.

In Embodiment 1, a material having a large value of θgF and a material having a small value of θgF are respectively used for the positive lenses and the negative lenses in the front first lens unit U11 having a higher incident height of the pupil paraxial ray at the telephoto end, and the lenses are disposed with appropriate refractive powers. Thus, the zoom variation of the secondary spectrum of the lateral chromatic aberration is effectively corrected. Further, in Embodiment 1, materials having appropriate values of θgF are used for the positive lenses and the negative lenses in the second lens unit U2 having a lower incident height of the pupil paraxial ray at the telephoto end, and the lenses are disposed. Thus, the variation of the secondary spectrum of the axial chromatic aberration depending on zooming, which is excessively corrected in the front first lens unit U11, is effectively corrected.

The front fourth lens unit U4a of Numerical Embodiment 1 is constituted of three positive lenses and one negative lens and includes, in order from the object side, a positive lens, a positive lens, and a cemented lens of a positive lens and a negative lens.

The rear fourth lens unit U4b of Numerical Embodiment 1 is constituted of four positive lenses and two negative lenses and includes, in order from the object side, a positive lens, a cemented lens of a negative lens and a positive lens, a cemented lens of a positive lens and a negative lens, and a positive lens.

In Embodiment 1, a material having a large value of θgF and a material having a small value of θgF are respectively used for the positive lenses and the negative lenses in the rear fourth lens unit U4b having a higher incident height of the pupil paraxial ray at the wide angle end, and the lenses are disposed with appropriate refractive powers. Thus, the secondary spectrum of the lateral chromatic aberration at the wide angle end is effectively corrected. Further, in Embodiment 1, materials having appropriate values of θgF are used for the positive lenses and the negative lenses in the front fourth lens unit U4a having a lower incident height of the pupil paraxial ray at the wide angle end, and the lenses are disposed. Thus, the secondary spectrum of the axial chromatic aberration, which is excessively corrected in the rear fourth lens unit U4b, is effectively corrected.

Figure 2A:
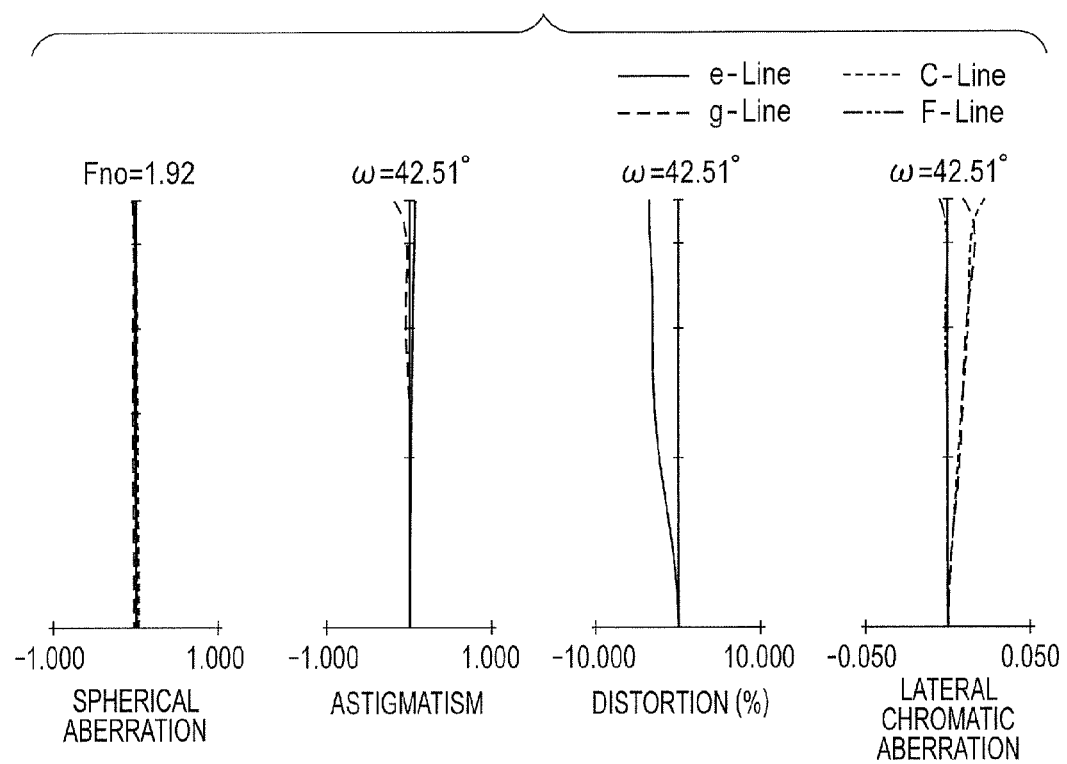
FIG. 2A is a longitudinal aberration diagram at the wide angle end at an object distance of 2.8 m according to Numerical Embodiment 1.
Figure 2B:
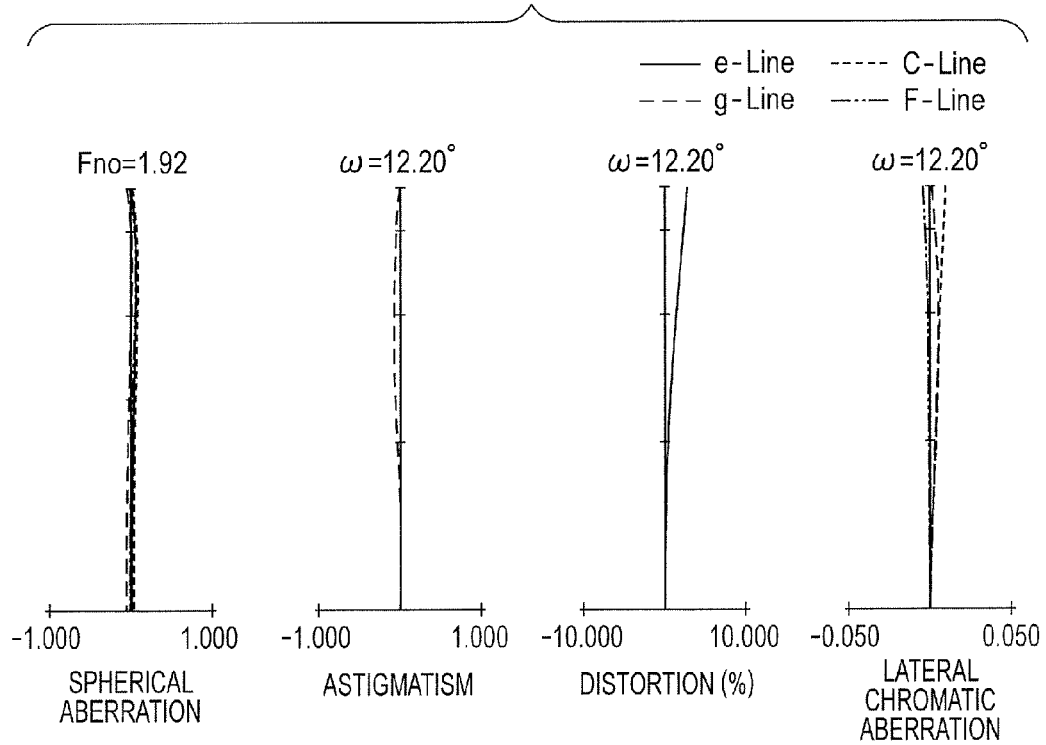
FIG. 2B is a longitudinal aberration diagram at a focal length of 25.44 mm according to Numerical Embodiment 1.
Figure 2C:
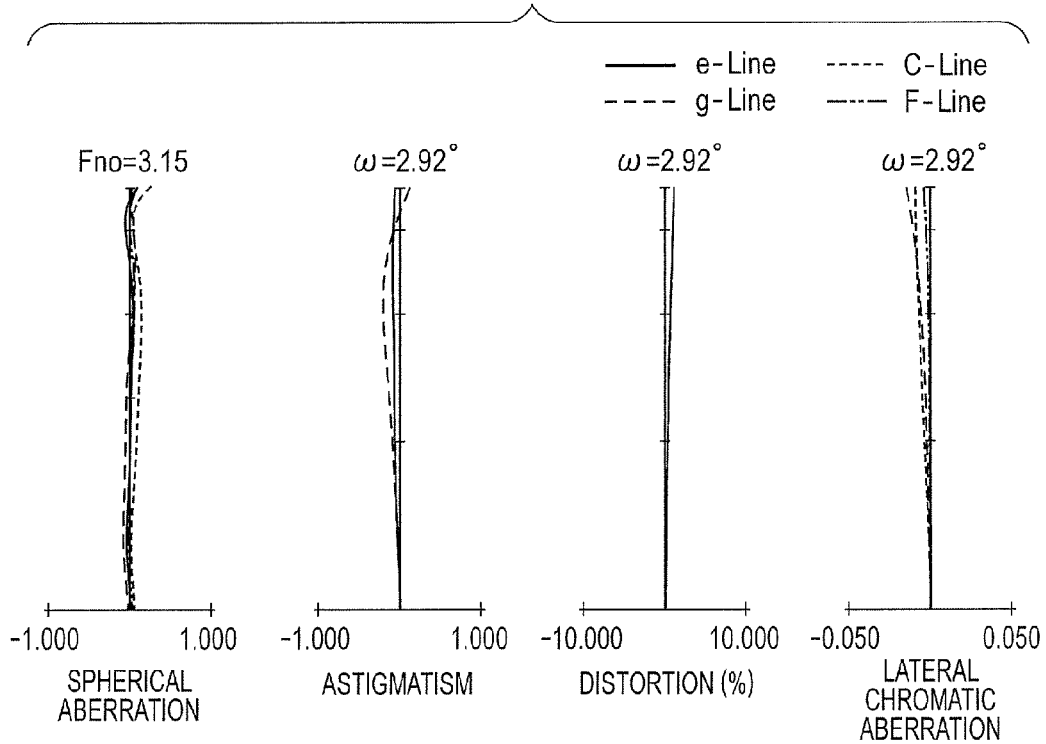
FIG. 2C is a longitudinal aberration diagram at a telephoto end according to Numerical Embodiment 1.

FIGS. 2A, 2B, and 2C are longitudinal aberration diagrams at a wide angle end at an object distance of 2.8 m, at a focal length of 25.44 mm, and at a telephoto end, respectively, according to Numerical Embodiment 1. In the aberration diagrams, the spherical aberrations are illustrated by the e-line, the g-line, the C-line, and the F-line. The astigmatisms are illustrated by a meridional image plane (ΔM) on the e-line and a sagittal image plane (ΔS) on the e-line. The lateral chromatic aberrations are illustrated by the g-line, the C-line, and the F-line. "Fno" represents an F number, and "ω" represents a half angle of field. In all of the aberration diagrams, the spherical aberrations are illustrated in a scale of 1.0 mm, the astigmatisms are illustrated in a scale of 1.0 mm, the distortions are illustrated in a scale of 10%, and the lateral chromatic aberrations are illustrated in a scale of 0.05 mm. The same is true for each of the following embodiments.

Note that, the wide angle end and the telephoto end refer to zoom positions when the second lens unit U2 for varying magnification is positioned at respective ends of its mechanically movable range on the optical axis.

Table 1 shows corresponding values of the conditional expressions of Embodiment 1. Numerical Embodiment 1 satisfies all of the conditional expressions (1) to (5) and (7), and both the axial chromatic aberration and the lateral chromatic aberration are appropriately corrected over the entire zoom range so that high optical performance is achieved. Table 2 shows corresponding values of hW_i, HW_i, hT_i, and HT_i of each surface of the front first lens unit U11 and the second lens unit U2, and the expression (19) in Embodiment 1.

Embodiment 1 achieves high magnification (zoom ratio) of 18, appropriately corrects chromatic aberration and various aberrations over the entire zoom range, and obtains high optical performance over the entire zoom range.

Embodiment 2

In the following, a lens structure according to Embodiment 2 of the present invention is described.

Figure 3:
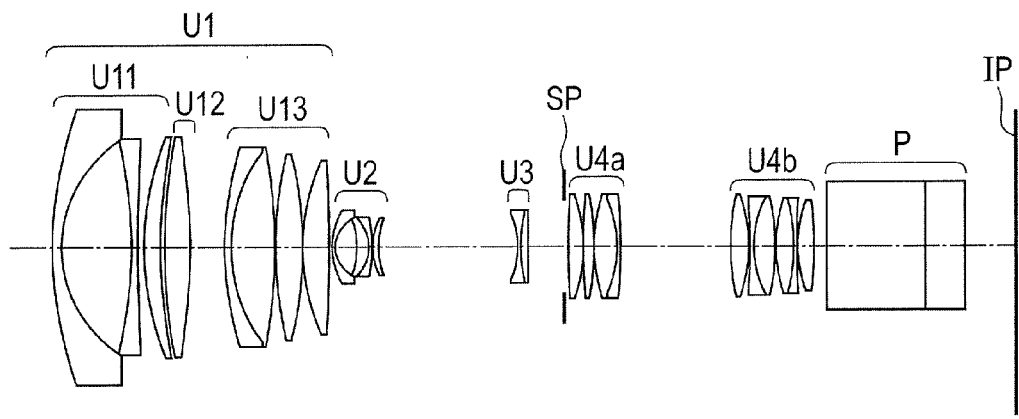
FIG. 3 is a cross-sectional view at the wide angle end in focus at infinity of a zoom lens according to Embodiment 2 of the present invention.

FIG. 3 is a lens cross-sectional view when an object at infinity is focused at a wide angle end of a zoom lens according to Embodiment 2 (Numerical Embodiment 2) of the present invention.

A first lens unit U1 has positive refractive power that is fixed during the magnification-varying. The first lens unit U1 includes, in order from the object side, the front first lens unit U11 having negative refractive power as a fixed lens unit, the middle first lens unit U12 having positive refractive power as a focus lens unit, and the rear first lens unit U13 having positive refractive power as a fixed lens unit. A second lens unit U2 (variator lens unit) has negative refractive power for varying magnification and moves to the image side during magnification-varying from the wide angle end (short focal length end) to the telephoto end (long focal length end). A third lens unit U3 (compensator lens unit) has negative refractive power and moves non-linearly on the optical axis in synchronization with movement of the second lens unit U2 so as to correct the image plane variation due to magnification-varying. An aperture stop SP does not move during magnification-varying and is disposed on the image side of the third lens unit U3. A fourth lens unit U4 (relay lens unit) has positive refractive power and does not move for varying magnification. The fourth lens unit U4 includes, with respect to a largest air interval as a boundary, the front fourth lens unit U4a having positive refractive power and the rear fourth lens unit U4b having positive refractive power.

A glass block P is a color separation prism or an optical filter. An image plane IP corresponds to an image pickup plane of a solid-state image pickup element (photoelectric transducer).

The front first lens unit U11 of Numerical Embodiment 2 is constituted of one positive lens and two negative lenses and includes, in order from the object side, a negative lens, a negative lens, and a positive lens. The second lens unit U2 of Numerical Embodiment 2 is constituted of two positive lenses and two negative lenses and includes, in order from the object side, a negative lens, a cemented lens of a positive lens and a negative lens, and a positive lens.

In Embodiment 2, a material having a large value of θgF and a material having a small value of θgF are respectively used for the positive lenses and the negative lenses in the front first lens unit U11 having a higher incident height of the pupil paraxial ray at the telephoto end, and the lenses are disposed with appropriate refractive powers. Thus, the zoom variation of the secondary spectrum of the lateral chromatic aberration is effectively corrected. Further, in Embodiment 2, materials having appropriate values of θgF are used for the positive lenses and the negative lenses in the second lens unit U2 having a lower incident height of the pupil paraxial ray at the telephoto end, and the lenses are disposed. Thus, the variation of the secondary spectrum of the axial chromatic aberration depending on zooming, which is excessively corrected in the front first lens unit U11, is effectively corrected.

The front fourth lens unit U4a of Numerical Embodiment 2 is constituted of three positive lenses and one negative lens and includes, in order from the object side, a positive lens, a positive lens, and a cemented lens of a positive lens and a negative lens.

The rear fourth lens unit U4b of Numerical Embodiment 2 is constituted of four positive lenses and two negative lenses and includes, in order from the object side, a positive lens, a cemented lens of a negative lens and a positive lens, a cemented lens of a positive lens and a negative lens, and a positive lens.

In Embodiment 2, a material having a large value of θgF and a material having a small value of θgF are respectively used for the positive lenses and the negative lenses in the rear fourth lens unit U4b having a higher incident height of the pupil paraxial ray at the wide angle end, and the lenses are disposed with appropriate refractive powers. Thus, the secondary spectrum of the lateral chromatic aberration at the wide angle end is effectively corrected. Further, in Embodiment 2, materials having appropriate values of θgF are used for the positive lenses and the negative lenses in the front fourth lens unit U4a having a lower incident height of the pupil paraxial ray at the wide angle end, and the lenses are disposed. Thus, the secondary spectrum of the axial chromatic aberration, which is excessively corrected in the rear fourth lens unit U4b, is effectively corrected.

Figure 4A:
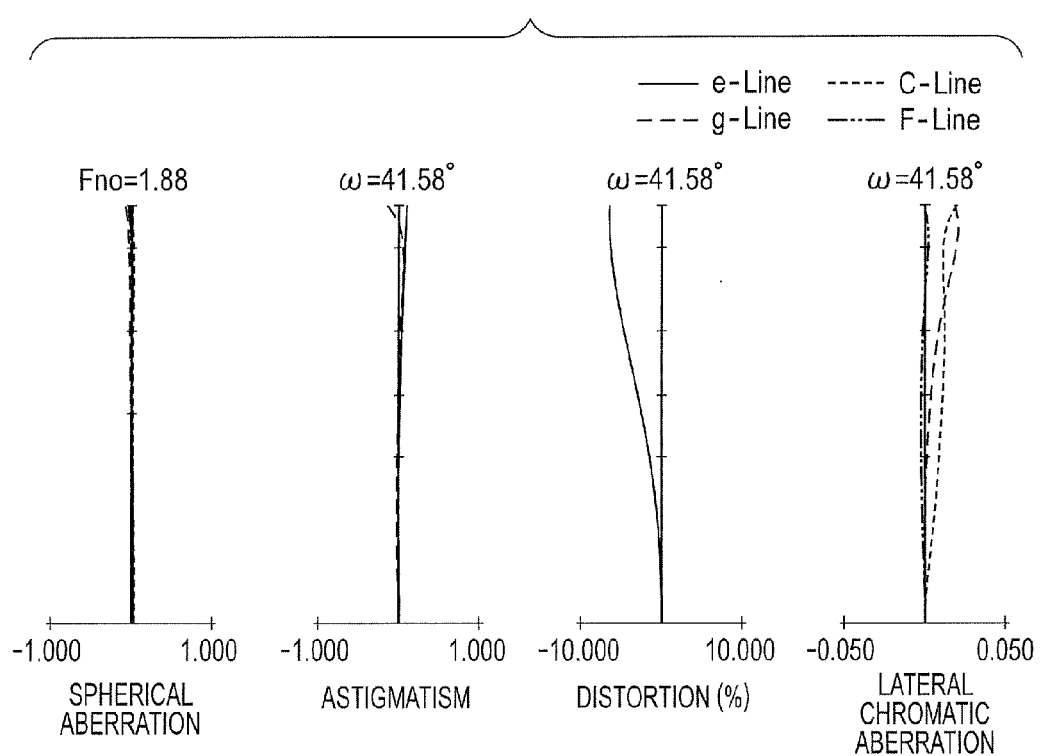
FIG. 4A is a longitudinal aberration diagram at the wide angle end at an object distance of 2.8 m according to Numerical Embodiment 2.
Figure 4B:
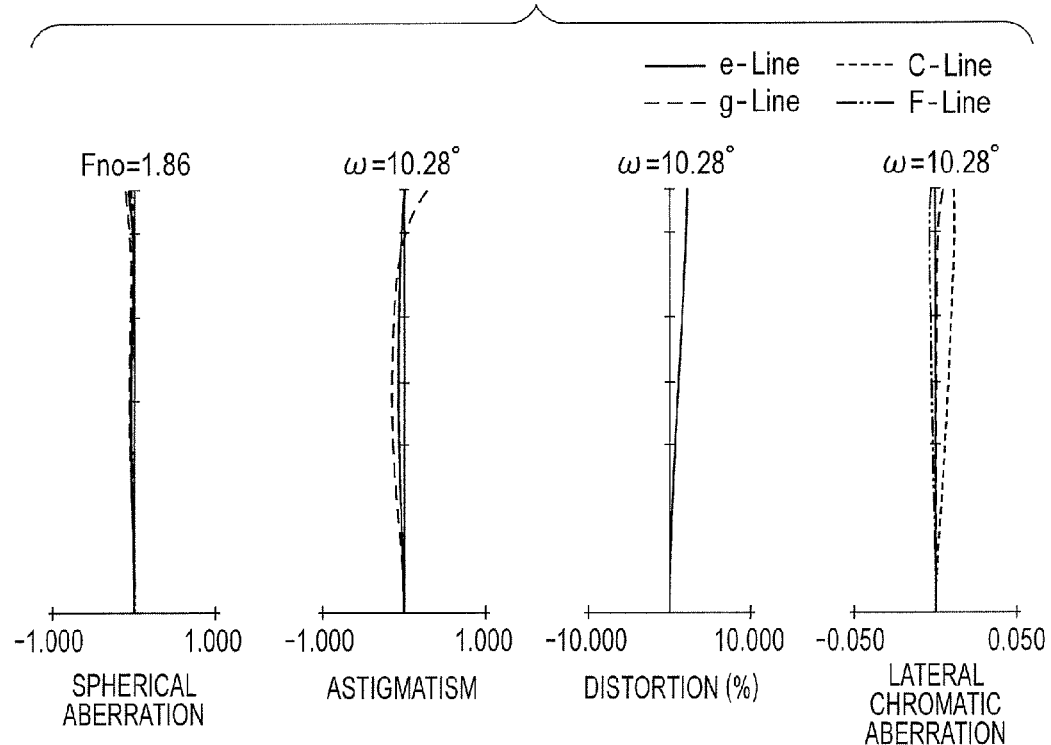
FIG. 4B is a longitudinal aberration diagram at a focal length of 30.32 mm according to Numerical Embodiment 2.
Figure 4C:
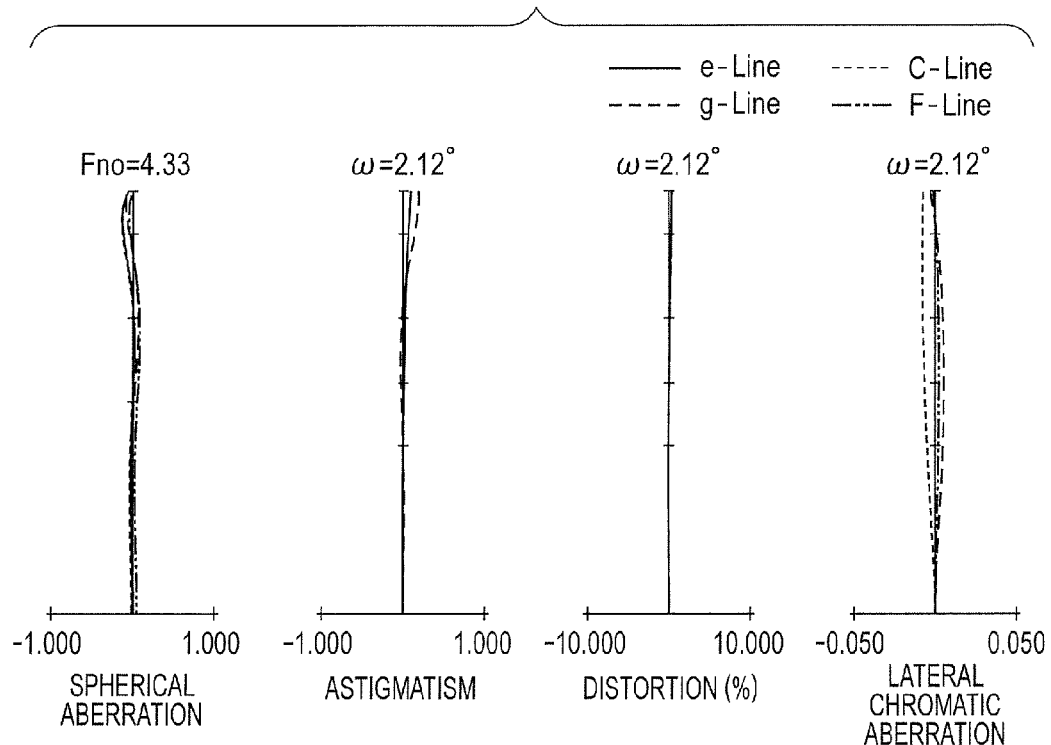
FIG. 4C is a longitudinal aberration diagram at the telephoto end according to Numerical Embodiment 2.

FIGS. 4A, 4B, and 4C are longitudinal aberration diagrams at a wide angle end at an object distance of 2.8 m, at a focal length of 30.32 mm, and at a telephoto end, respectively, according to Numerical Embodiment 2.

Table 1 shows corresponding values of the conditional expressions of Embodiment 2. Numerical Embodiment 2 satisfies all of the conditional expressions (1) to (5) and (7), and both the axial chromatic aberration and the lateral chromatic aberration are appropriately corrected over the entire zoom range so that high optical performance is achieved.

Table 3 shows corresponding values of hW_i, HW_i, hT_i, and HT_i of each surface of the front first lens unit U11 and the second lens unit U2, and the expression (19) in Embodiment 2.

Embodiment 2 achieves high magnification (zoom ratio) of 24, appropriately corrects chromatic aberration and various aberrations over the entire zoom range, and obtains high optical performance over the entire zoom range.

Embodiment 3

In the following, a lens structure according to Embodiment 3 of the present invention is described.

Figure 5:
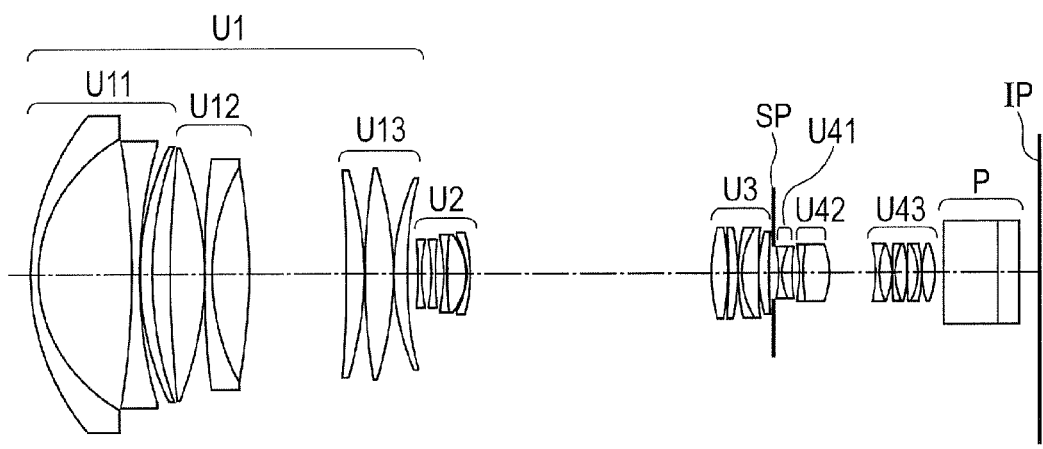
FIG. 5 is a cross-sectional view at the wide angle end in focus at infinity of a zoom lens according to Embodiment 3 of the present invention.

FIG. 5 is a lens cross-sectional view when an object at infinity is focused at a wide angle end of a zoom lens according to Embodiment 3 (Numerical Embodiment 3) of the present invention.

A first lens unit U1 has positive refractive power that is fixed during the magnification-varying. The first lens unit U1 includes, in order from the object side, the front first lens unit U11 having negative refractive power as a fixed lens unit, the middle first lens unit U12 having positive refractive power as a focus lens unit, and the rear first lens unit U13 having positive refractive power as a fixed lens unit. A second lens unit U2 (variator lens unit) has negative refractive power for varying magnification and moves to the image side during magnification-varying from the wide angle end (short focal length end) to the telephoto end (long focal length end). A third lens unit U3 (compensator lens unit) has positive refractive power and moves non-linearly on the optical axis in synchronization with movement of the second lens unit U2 so as to correct the image plane variation due to magnification-varying. An aperture stop SP does not move during magnification-varying and is disposed on the image side of the third lens unit U3. A fourth lens unit U4 (relay lens unit) has positive refractive power and does not move for varying magnification. The fourth lens unit U4 includes, in order from the object side, a front fourth lens unit having negative refractive power, a middle fourth lens unit as a magnification-varying lens unit which is inserted into and removed from the optical path so as to change the focal length range of the entire system, and a rear fourth lens unit having positive refractive power.

A glass block P is a color separation prism or an optical filter. An image plane IP corresponds to an image pickup plane of a solid-state image pickup element (photoelectric transducer).

The front first lens unit U11 of Numerical Embodiment 3 is constituted of one positive lens and two negative lenses and includes, in order from the object side, a negative lens, a negative lens, and a positive lens. The second lens unit U2 of Numerical Embodiment 3 is constituted of one positive lens and four negative lenses and includes, in order from the object side, a negative lens, a negative lens, a cemented lens of a negative lens and a positive lens, and a negative lens.

In Embodiment 3, a material having a large value of θgF and a material having a small value of θgF are respectively used for the positive lenses and the negative lenses in the front first lens unit U11 having a higher incident height of the pupil paraxial ray at the telephoto end, and the lenses are disposed with appropriate refractive powers. Thus, the zoom variation of the secondary spectrum of the lateral chromatic aberration is effectively corrected. Further, in Embodiment 3, materials having appropriate values of θgF are used for the positive lenses and the negative lenses in the second lens unit U2 having a lower incident height of the pupil paraxial ray at the telephoto end, and the lenses are disposed. Thus, the variation of the secondary spectrum of the axial chromatic aberration depending on zooming, which is excessively corrected in the front first lens unit U11, is effectively corrected.

The middle fourth lens unit U42 of Numerical Embodiment 3 is constituted of one positive lens and one negative lens and includes, in order from the object side, a cemented lens of a negative lens and a positive lens.

The rear fourth lens unit U43 of Numerical Embodiment 3 is constituted of four positive lenses and three negative lenses and includes, in order from the object side, a cemented lens of a negative lens and a positive lens, a cemented lens of a negative lens and a positive lens, a cemented lens of a positive lens and a negative lens, and a positive lens.

In Embodiment 3, a material having a large value of θgF and a material having a small value of θgF are respectively used for the positive lenses and the negative lenses in the rear fourth lens unit U43 having a higher incident height of the pupil paraxial ray at the wide angle end, and the lenses are disposed with appropriate refractive powers. Thus, the secondary spectrum of the lateral chromatic aberration at the wide angle end is effectively corrected. Further, in Embodiment 3, materials having appropriate values of θgF are used for the positive lenses and the negative lenses in the middle fourth lens unit U42 having a lower incident height of the pupil paraxial ray at the wide angle end, and the lenses are disposed. Thus, the secondary spectrum of the axial chromatic aberration, which is excessively corrected in the rear fourth lens unit U43, is effectively corrected.

Figure 6A:
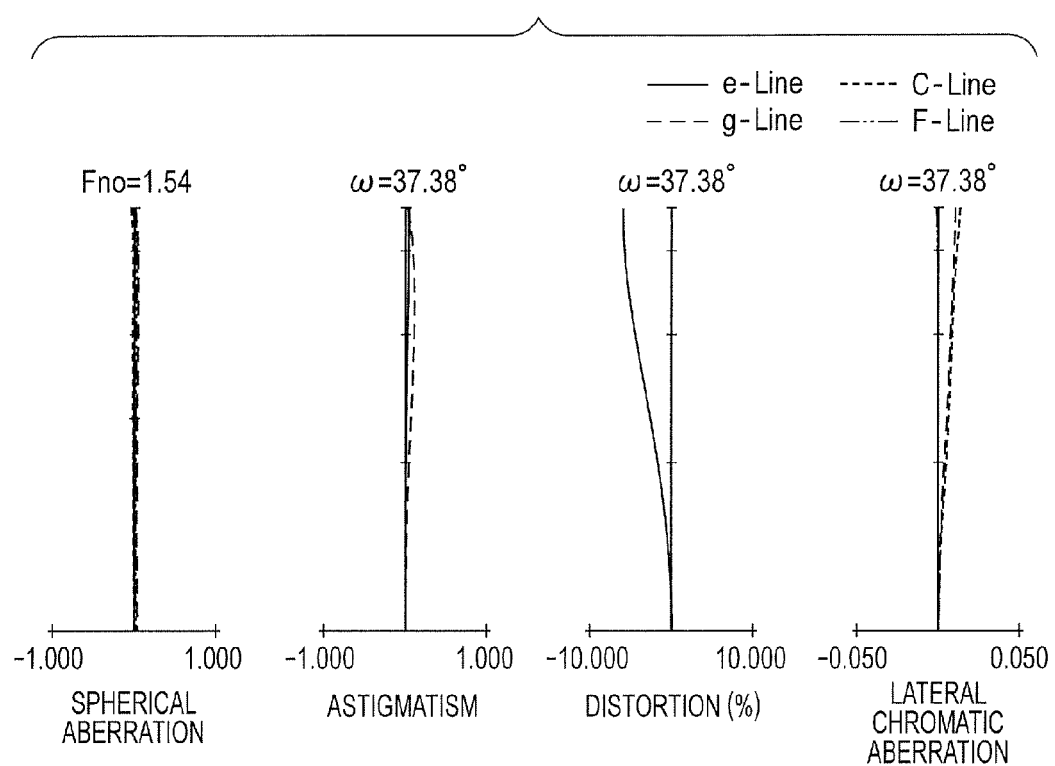
FIG. 6A is a longitudinal aberration diagram at the wide angle end at an object distance of 3.5 m according to Numerical Embodiment 3.
Figure 6B:
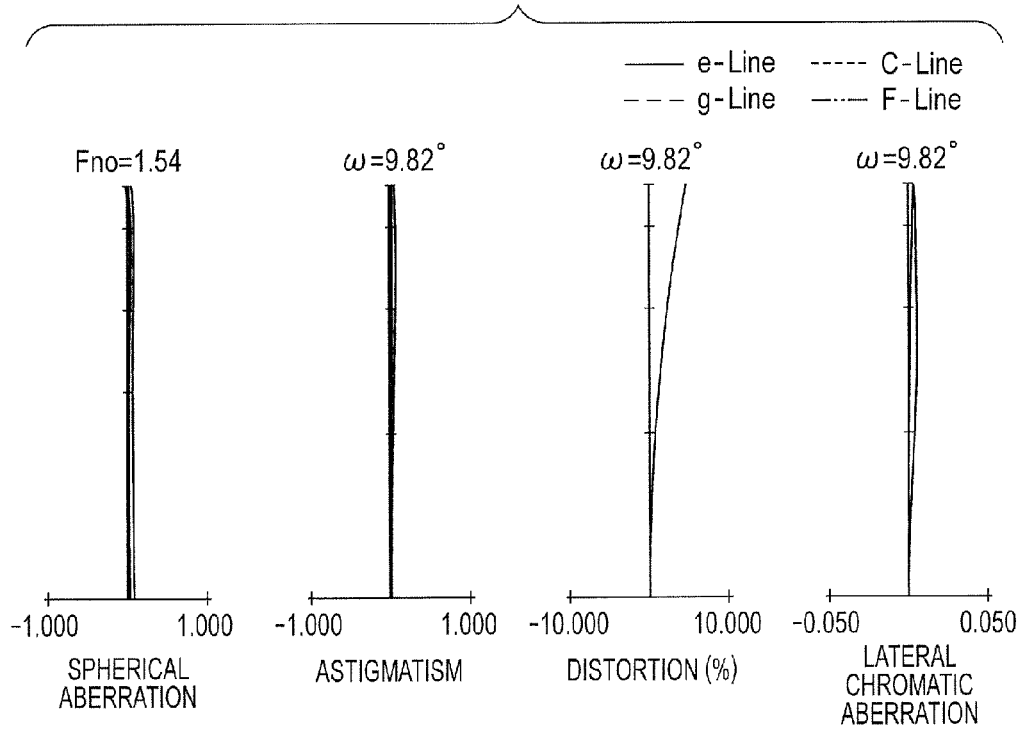
FIG. 6B is a longitudinal aberration diagram at a focal length of 31.78 mm according to Numerical Embodiment 3.
Figure 6C:
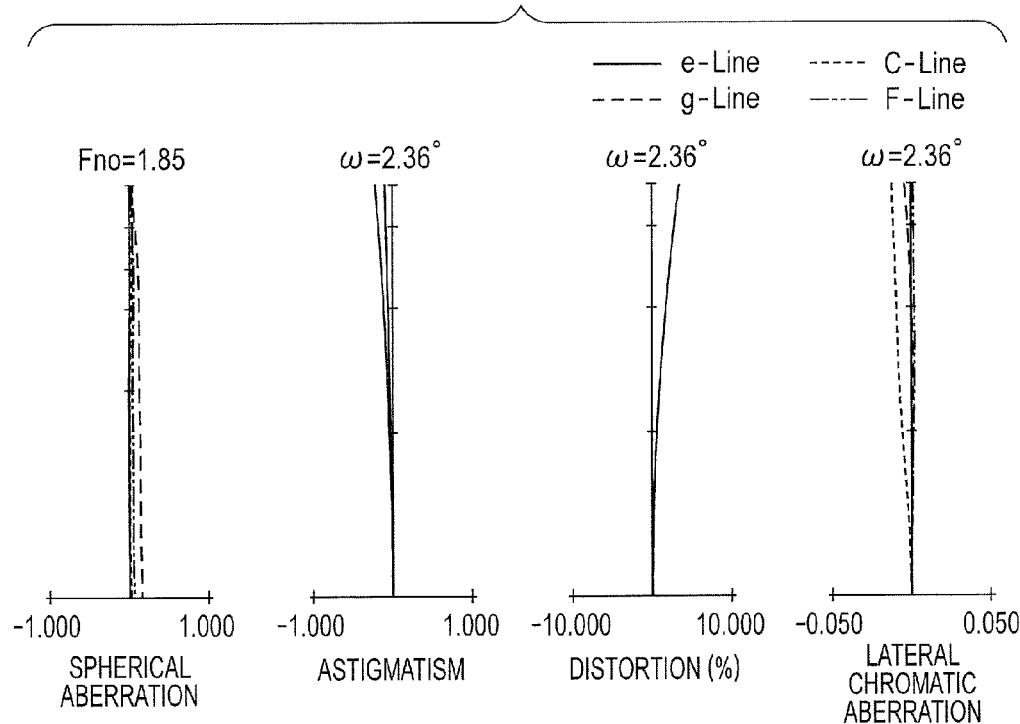
FIG. 6C is a longitudinal aberration diagram at the telephoto end according to Numerical Embodiment 3.

FIGS. 6A, 6B, and 6C are longitudinal aberration diagrams at a wide angle end at an object distance of 3.5 m, at a focal length of 31.78 mm, and at a telephoto end, respectively, according to Numerical Embodiment 3.

Table 1 shows corresponding values of the conditional expressions of Embodiment 3. Numerical Embodiment 3 satisfies all of the conditional expressions (1) to (6), and both the axial chromatic aberration and the lateral chromatic aberration are appropriately corrected over the entire zoom range so that high optical performance is achieved.

Table 4 shows corresponding values of hW_i, HW_i, hT_i, and HT_i of each surface of the front first lens unit U11 and the second lens unit U2, and the expression (19) in Embodiment 3.

Embodiment 3 achieves high magnification (zoom ratio) of 18.5, appropriately corrects chromatic aberration and various aberrations over the entire zoom range, and obtains high optical performance over the entire zoom range.

Embodiment 4

In the following, a lens structure according to Embodiment 4 of the present invention is described.

Figure 7:
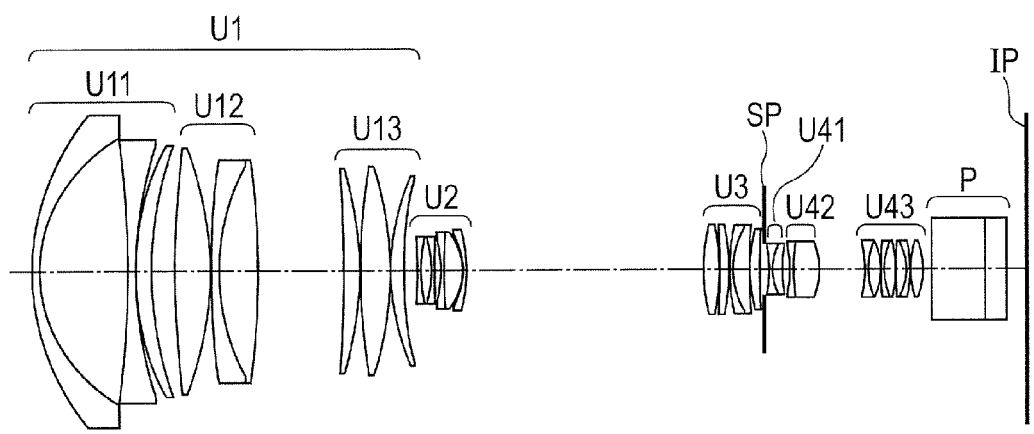
FIG. 7 is a cross-sectional view at the wide angle end in focus at infinity of a zoom lens according to Embodiment 4 of the present invention.

FIG. 7 is a lens cross-sectional view when an object at infinity is focused at a wide angle end of a zoom lens according to Embodiment 4 (Numerical Embodiment 4) of the present invention.

A first lens unit U1 has positive refractive power that is fixed during the magnification-varying. The first lens unit U1 includes, in order from the object side, the front first lens unit U11 having negative refractive power as a fixed lens unit, the middle first lens unit U12 having positive refractive power as a focus lens unit, and the rear first lens unit U13 having positive refractive power as a fixed lens unit. A second lens unit U2 (variator lens unit) has negative refractive power for varying magnification and moves to the image side during magnification-varying from the wide angle end (short focal length end) to the telephoto end (long focal length end). A third lens unit U3 (compensator lens unit) has positive refractive power and moves non-linearly on the optical axis in synchronization with movement of the second lens unit U2 so as to correct the image plane variation due to magnification-varying. An aperture stop SP does not move during magnification-varying and is disposed on the image side of the third lens unit U3. A fourth lens unit U4 (relay lens unit) has positive refractive power and does not move for varying magnification. The fourth lens unit U4 includes, in order from the object side, a front fourth lens unit having negative refractive power, a middle fourth lens unit as a magnification-varying lens unit which is inserted into and removed from the optical path so as to change the focal length range of the entire system, and a rear fourth lens unit having positive refractive power.

A glass block P is a color separation prism or an optical filter. An image plane IP corresponds to an image pickup plane of a solid-state image pickup element (photoelectric transducer).

The front first lens unit U11 of Numerical Embodiment 4 is constituted of one positive lens and two negative lenses and includes, in order from the object side, a negative lens, a negative lens, and a positive lens. The second lens unit U2 of Numerical Embodiment 4 is constituted of one positive lens and four negative lenses and includes, in order from the object side, a negative lens, a negative lens, a cemented lens of a negative lens and a positive lens, and a negative lens.

In Embodiment 4, a material having a large value of θgF and a material having a small value of θgF are respectively used for the positive lenses and the negative lenses in the front first lens unit U11 having a higher incident height of the pupil paraxial ray at the telephoto end, and the lenses are disposed with appropriate refractive powers. Thus, the variation of the secondary spectrum of the lateral chromatic aberration depending on zooming is effectively corrected. Further, in Embodiment 4, materials having appropriate values of θgF are used for the positive lenses and the negative lenses in the second lens unit U2 having a lower incident height of the pupil paraxial ray at the telephoto end, and the lenses are disposed. Thus, the variation of the secondary spectrum of the axial chromatic aberration depending on zooming, which is excessively corrected in the front first lens unit U11, is effectively corrected.

The middle fourth lens unit U42 of Numerical Embodiment 4 is constituted of one positive lens and one negative lens and includes, in order from the object side, a cemented lens of a negative lens and a positive lens.

The rear fourth lens unit U43 of Numerical Embodiment 4 is constituted of four positive lenses and three negative lenses and includes, in order from the object side, a cemented lens of a negative lens and a positive lens, a cemented lens of a negative lens and a positive lens, a cemented lens of a positive lens and a negative lens, and a positive lens.

In Embodiment 4, a material having a large value of θgF and a material having a small value of θgF are respectively used for the positive lenses and the negative lenses in the rear fourth lens unit U43 having a higher incident height of the pupil paraxial ray at the wide angle end, and the lenses are disposed with appropriate refractive powers. Thus, the secondary spectrum of the lateral chromatic aberration at the wide angle end is effectively corrected. Further, in Embodiment 4, materials having appropriate values of θgF are used for the positive lenses and the negative lenses in the middle fourth lens unit U42 having a lower incident height of the pupil paraxial ray at the wide angle end, and the lenses are disposed. Thus, the secondary spectrum of the axial chromatic aberration, which is excessively corrected in the rear fourth lens unit U43, is effectively corrected.

Figure 8A:
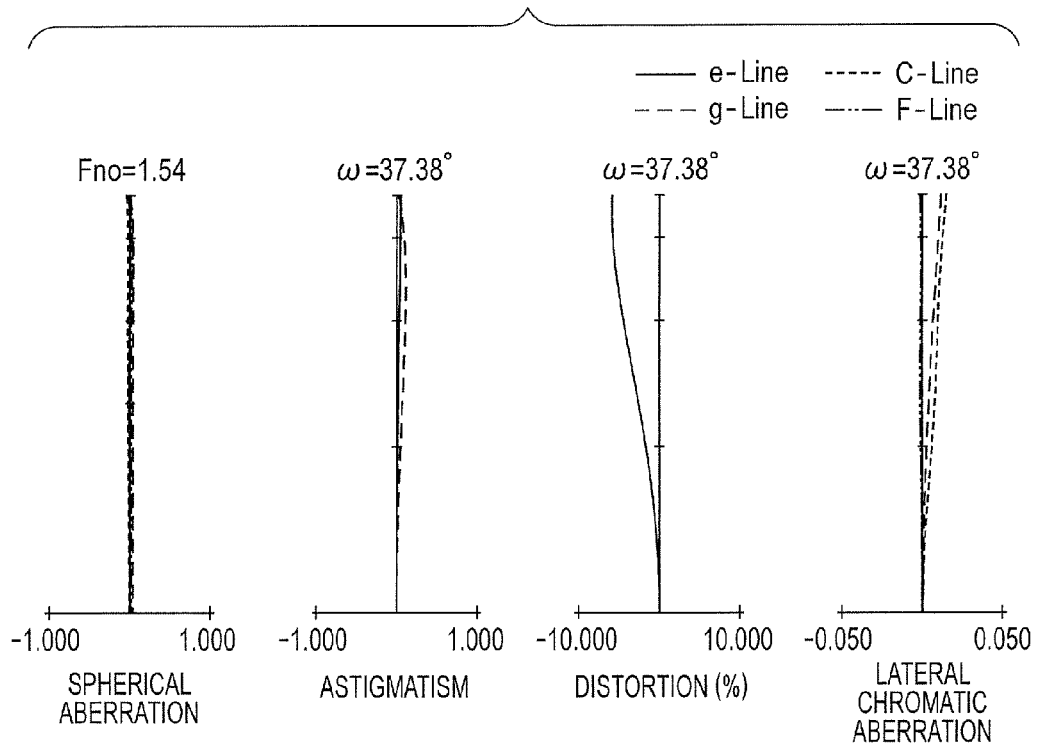
FIG. 8A is a longitudinal aberration diagram at the wide angle end at an object distance of 3.5 m according to Numerical Embodiment 4.
Figure 8B:
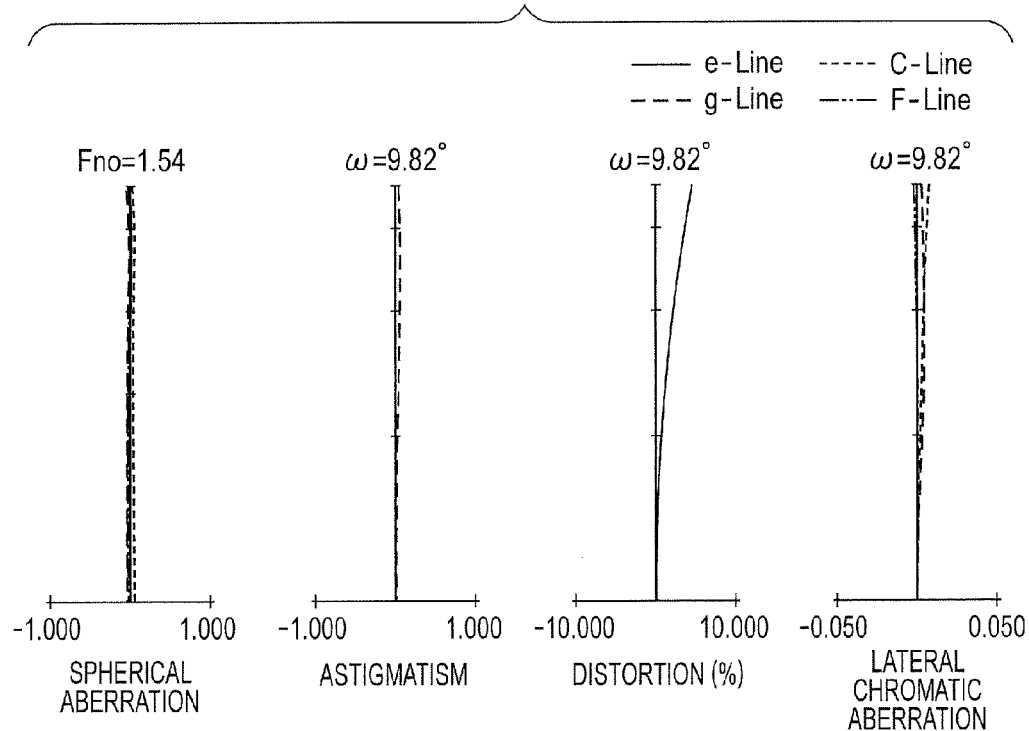
FIG. 8B is a longitudinal aberration diagram at a focal length of 31.78 mm according to Numerical Embodiment 4.
Figure 8C:
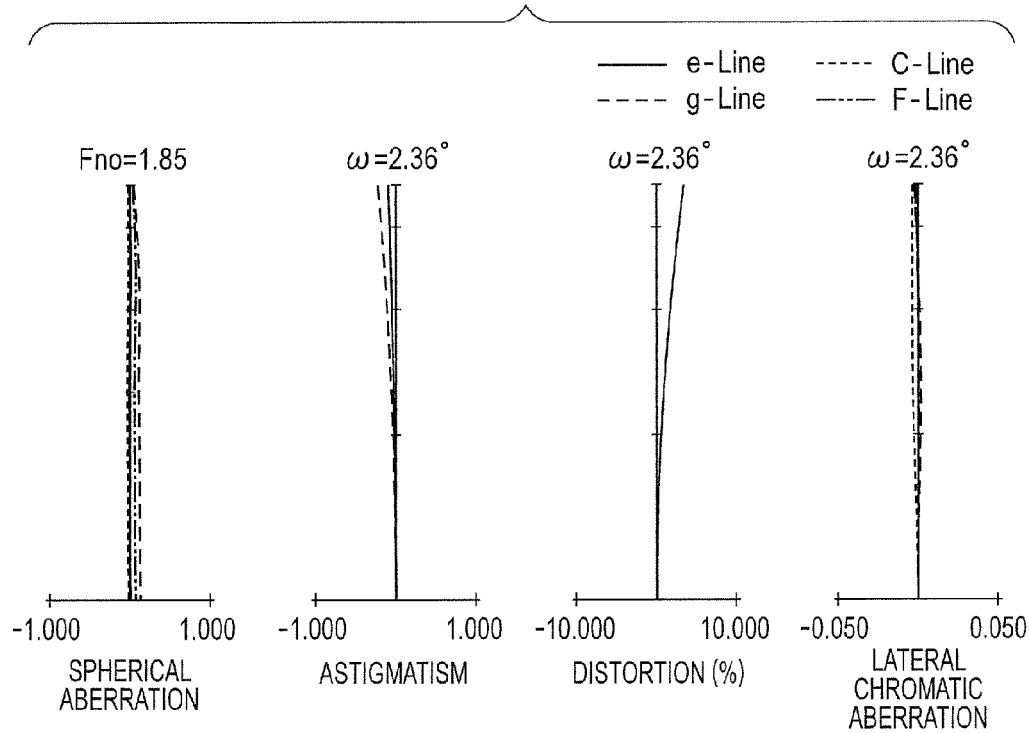
FIG. 8C is a longitudinal aberration diagram at the telephoto end according to Numerical Embodiment 4.

FIGS. 8A, 8B, and 8C are longitudinal aberration diagrams at a wide angle end at an object distance of 3.5 m, at a focal length of 31.78 mm, and at a telephoto end, respectively, according to Numerical Embodiment 4.

Table 1 shows corresponding values of the conditional expressions of Embodiment 4. Numerical Embodiment 4 satisfies all of the conditional expressions (1) to (6) and the value is close to the upper limit of the conditional expression (6). Both the axial chromatic aberration and the lateral chromatic aberration are appropriately corrected over the entire zoom range so that high optical performance is achieved.

Table 5 shows corresponding values of hW_i, HW_i, hT_i, and HT_i of each surface of the front first lens unit U11 and the second lens unit U2, and the expression (19) in Embodiment 4.

Embodiment 4 achieves high magnification (zoom ratio) of 18.5, appropriately corrects chromatic aberration and various aberrations over the entire zoom range, and obtains high optical performance over the entire zoom range.

Embodiment 5

In the following, a lens structure according to Embodiment 5 of the present invention described.

Figure 9:
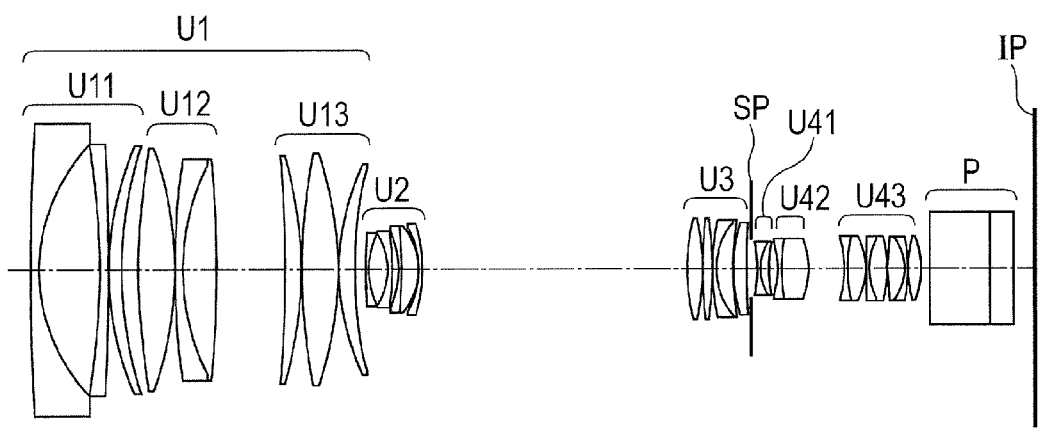
FIG. 9 is a cross-sectional view at the wide angle end in focus at infinity of a zoom lens according to Embodiment 5 of the present invention.

FIG. 9 is a lens cross-sectional view when an object at infinity is focused at a wide angle end of a zoom lens according to Embodiment 5 (Numerical Embodiment 5) of the present invention.

A first lens unit U1 has positive refractive power that is fixed during the magnification-varying. The first lens unit U1 includes, in order from the object side, the front first lens unit U11 having negative refractive power as a fixed lens unit, the middle first lens unit U12 having positive refractive power as a focus lens unit, and the rear first lens unit U13 having positive refractive power as a fixed lens unit. A second lens unit U2 (variator lens unit) has negative refractive power for varying magnification and moves to the image side during magnification-varying from the wide angle end (short focal length end) to the telephoto end (long focal length end). A third lens unit U3 (compensator lens unit) has positive refractive power and moves non-linearly on the optical axis in synchronization with movement of the second lens unit U2 so as to correct the image plane variation due to magnification-varying. An aperture stop SP does not move during magnification-varying and is disposed on the image side of the third lens unit U3. A fourth lens unit U4 (relay lens unit) has positive refractive power and does not move for varying magnification. The fourth lens unit U4 includes, in order from the object side, a front fourth lens unit having negative refractive power, a middle fourth lens unit as a magnification-varying lens unit which is inserted into and removed from the optical path so as to change the focal length range of the entire system, and a rear fourth lens unit having positive refractive power.

A glass block P is a color separation prism or an optical filter. An image plane IP corresponds to an image pickup plane of a solid-state image pickup element (photoelectric transducer).

The front first lens unit U11 of Numerical Embodiment 5 is constituted of one positive lens and two negative lenses and includes, in order from the object side, a negative lens, a negative lens, and a positive lens. The second lens unit U2 of Numerical Embodiment 5 is constituted of one positive lens and four negative lenses and includes, in order from the object side, a negative lens, a negative lens, a cemented lens of a negative lens and a positive lens, and a negative lens.

In Embodiment 5, a material having a large value of θgF and a material having a small value of 8gF are respectively used for the positive lenses and the negative lenses in the front first lens unit U11 having a higher incident height of the pupil paraxial ray at the telephoto end, and the lenses are disposed with appropriate refractive powers. Thus, the variation of the secondary spectrum of the lateral chromatic aberration depending on zooming is effectively corrected. Further, in Embodiment 5, materials having appropriate values of θgF are used for the positive lenses and the negative lenses in the second lens unit U2 having a lower incident height of the pupil paraxial ray at the telephoto end, and the lenses are disposed. Thus, the variation of the secondary spectrum of the axial chromatic aberration depending on zooming, which is excessively corrected in the front first lens unit U11, is effectively corrected.

The middle fourth lens unit U42 of Numerical Embodiment 5 is constituted of one positive lens and one negative lens and includes, in order from the object side, a cemented lens of a negative lens and a positive lens.

The rear fourth lens unit U43 of Numerical Embodiment 5 is constituted of four positive lenses and three negative lenses and includes, in order from the object side, a cemented lens of a negative lens and a positive lens, a cemented lens of a negative lens and a positive lens, a cemented lens of a positive lens and a negative lens, and a positive lens.

In Embodiment 5, a material having a large value of 8gF and a material having a small value of θgF are respectively used for the positive lenses and the negative lenses in the rear fourth lens unit U43 having a higher incident height of the pupil paraxial ray at the wide angle end, and the lenses are disposed with appropriate refractive powers. Thus, the secondary spectrum of the lateral chromatic aberration at the wide angle end is effectively corrected. Further, in Embodiment 5, materials having appropriate values of θgF are used for the positive lenses and the negative lenses in the middle fourth lens unit U42 having a lower incident height of the pupil paraxial ray at the wide angle end, and the lenses are disposed. Thus, the secondary spectrum of the axial chromatic aberration, which is excessively corrected in the rear fourth lens unit U43, is effectively corrected.

Figure 10A:
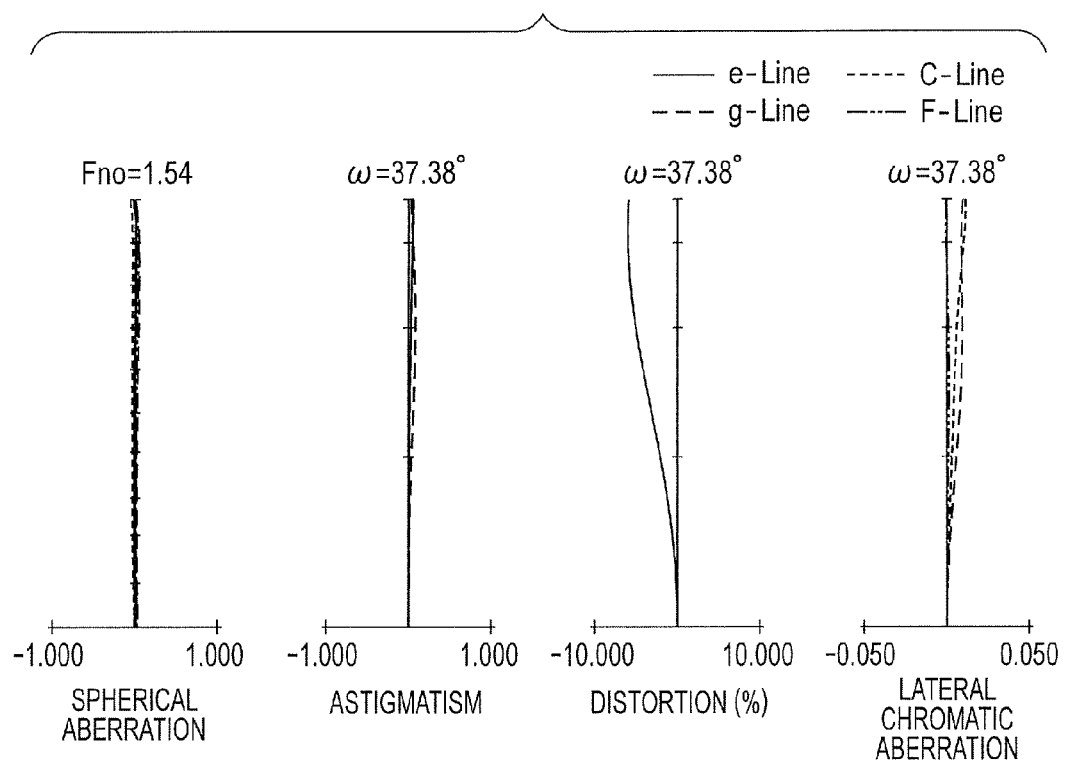
FIG. 10A is a longitudinal aberration diagram at the wide angle end at an object distance of 3.5 m according to Numerical Embodiment 5.
Figure 10B:
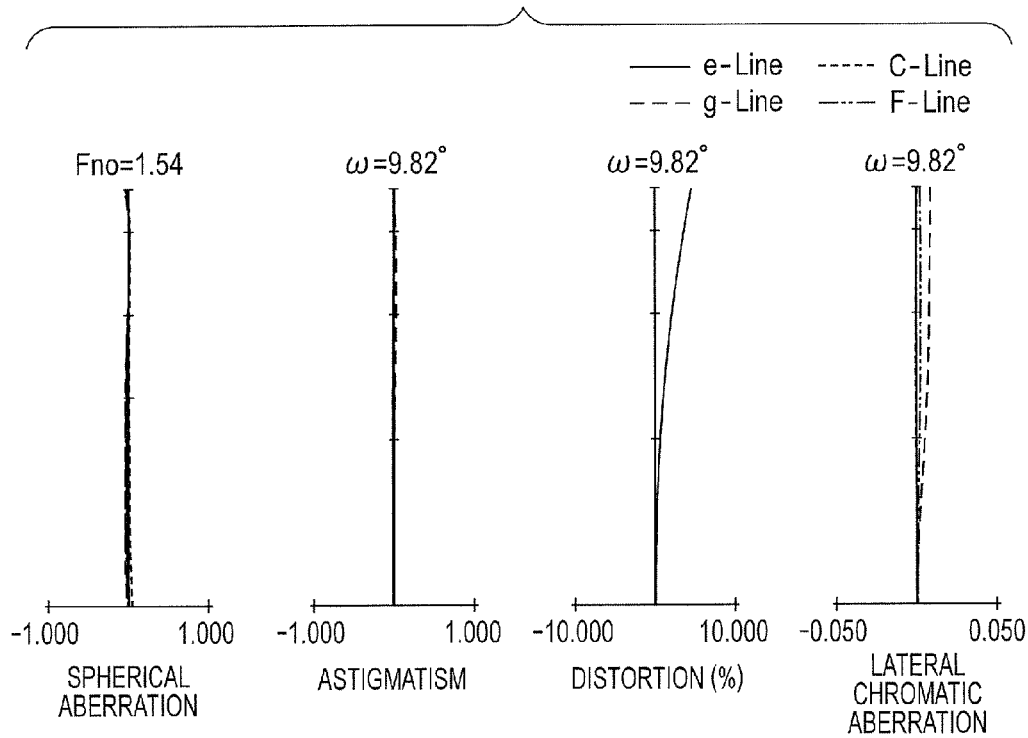
FIG. 10B is a longitudinal aberration diagram at a focal length of 31.78 mm according to Numerical Embodiment 5.
Figure 10C:
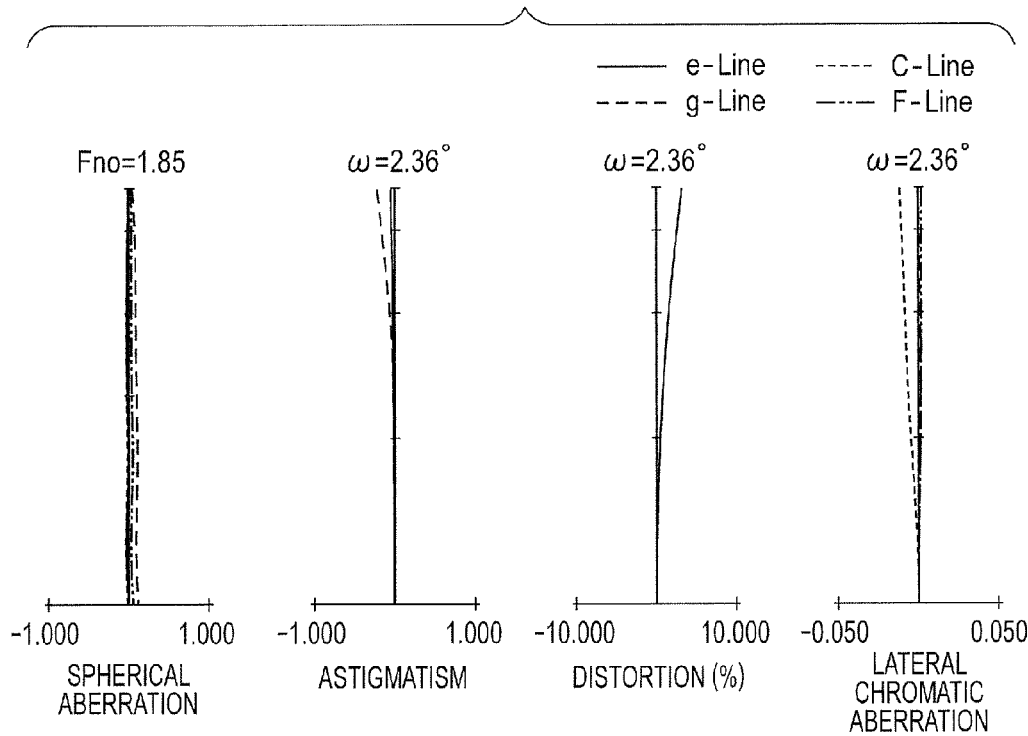
FIG. 10C is a longitudinal aberration diagram at the telephoto end according to Numerical Embodiment 5.

FIGS. 10A, 10B, and 10C are longitudinal aberration diagrams at a wide angle end at an object distance of 3.5 m, at a focal length of 31.78 mm, and at a telephoto end, respectively, according to Numerical Embodiment 5.

Table 1 shows corresponding values of the conditional expressions of Embodiment 5. Numerical Embodiment 5 satisfies all of the conditional expressions (1) to (6), and both the axial chromatic aberration and the lateral chromatic aberration are appropriately corrected over the entire zoom range so that high optical performance is achieved.

Table 6 shows corresponding values of hW_i, HW_i, hT_i, and HT_i of each surface of the front first lens unit U11 and the second lens unit U2, and the expression (19) in Embodiment 5.

Embodiment 5 achieves high magnification (zoom ratio) of 18.5, appropriately corrects chromatic aberration and various aberrations over the entire zoom range, and obtains high optical performance over the entire zoom range.

Figure 11:
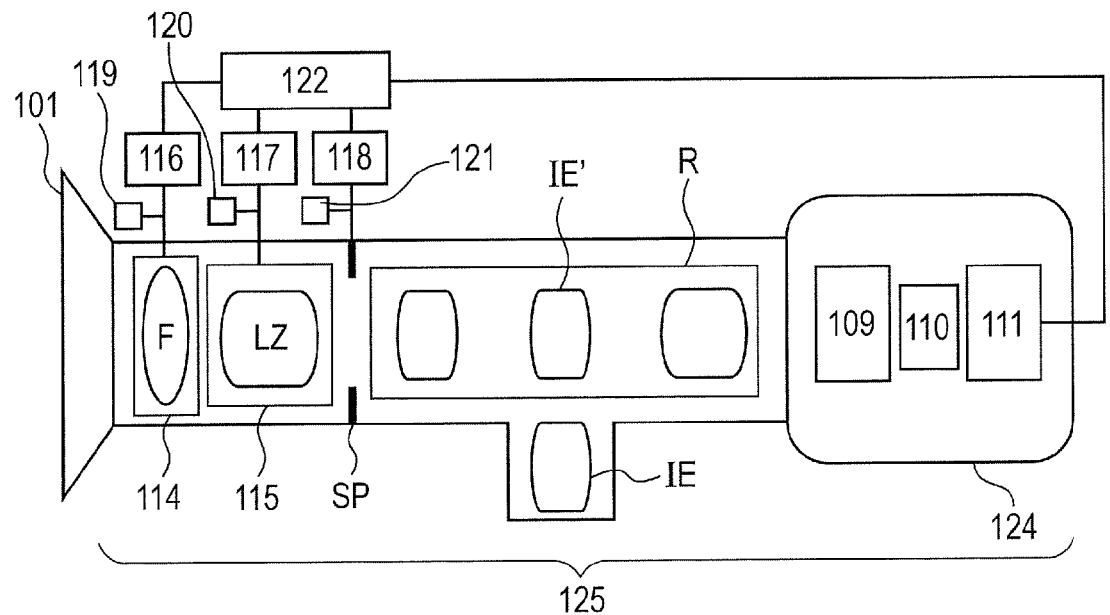
FIG. 11 is a schematic diagram of a main part of an image pickup apparatus according to the present invention.

With reference to FIG. 11, an overview of an image pickup apparatus (television camera system) using the zoom lens according to each embodiment as an image pickup optical system is described. FIG. 11 is a schematic diagram illustrating a main part of the image pickup apparatus according to the present invention.

In FIG. 11, a zoom lens 101 according to any one of Embodiments 1 to 5 and a camera 124 are provided. The zoom lens 101 is removably mounted to the camera 124. An image pickup apparatus 125 is constructed by mounting the zoom lens 101 to the camera 124.

The zoom lens 101 includes a first lens unit F, a magnification-varying section LZ, and a fourth lens unit R for imaging. The first lens unit F includes a focusing lens unit. The magnification-varying section LZ includes a second lens unit which moves on the optical axis for varying magnification and a third lens unit which moves on the optical axis so as to correct image plane variation due to magnification-varying.

The zoom lens 101 includes an aperture stop SP. The fourth lens unit R includes a lens unit (magnification-varying optical system) IE which may be inserted onto or removed from the optical path.

The lens unit IE is provided to change the focal length range of the entire system of the zoom lens 101.

Drive mechanisms 114 and 115 such as helicoids and cams drive the first lens unit F and the magnification-varying section LZ, respectively, in the optical axis direction.

Motors (drive units) 116 to 118 are provided to electrically drive the drive mechanisms 114 and 115 and the aperture stop SP.

Detectors 119 to 121 such as encoders, potentiometers, and photosensors detect positions of the first lens unit F and the magnification-varying section LZ along the optical axis and a stop diameter of the aperture stop SP.

The camera 124 includes a glass block 109 corresponding to an optical filter or a color separation prism inside the camera 124, and a solid-state image pickup element (photoelectric transducer) 110, such as a CCD sensor and a CMOS sensor, for receiving light of a subject image formed by the zoom lens 101.

CPUs 111 and 122 perform various kinds of drive control for the camera 124 and the main body of the zoom lens 101, respectively.

When the zoom lens according to the present invention is applied to a television camera as described above, the image pickup apparatus having high optical performance is realized.

In Numerical Embodiments described below, a surface number "i" is counted from the object side. In addition, "ri" represents a curvature radius of an i-th lens counted from the object side, and "di" represents an interval between the i-th lens and an (i+1)-th surface which are counted from the object side. Further, "Ni", "vi", and "θgFi" represent a refractive index, an Abbe constant, and a partial dispersion ratio of an i-th optical material, respectively. Last three surfaces correspond to a glass block such as a filter.

Assume that the optical axis direction is an X-axis, a direction perpendicular to the optical axis is an H axis, and a light traveling direction is positive. In this case, when "R" represents a paraxial curvature radius, "k" represents a conic constant, and "A3", "A4", "A5", "A6", "A7", "ΔS", "A9", "A10", "A11", "A12", "A13", "A14", "A15", and "A16" represent aspherical coefficients, an aspherical surface shape is expressed by the following expression.

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

For example, "e-Z" represents "×10$^{-Z}$". The mark "*" represents the aspherical surface.

Numerical Embodiment 1

Surface data

| i-th surface | ri | di | ndi | vdi | θgFi | Effective diameter | Focal length |
|---|---|---|---|---|---|---|---|
| 1* | 1647.056 | 2.97 | 1.81600 | 46.6 | 0.5568 | 85.60 | −51.10 |
| 2 | 40.844 | 19.15 | | | | 66.55 | |
| 3 | −332.596 | 2.10 | 1.77249 | 49.6 | 0.5521 | 66.53 | −264.44 |
| 4 | 537.619 | 0.99 | | | | 66.77 | |
| 5 | 83.310 | 5.77 | 1.95906 | 17.5 | 0.6598 | 68.13 | 221.56 |
| 6 | 131.234 | 0.99 | | | | 67.15 | |
| 7 | 118.948 | 11.68 | 1.51633 | 64.1 | 0.5352 | 66.92 | 122.68 |
| 8* | −132.010 | 8.60 | | | | 65.68 | |
| 9 | 121.920 | 2.10 | 1.80518 | 25.4 | 0.6161 | 62.69 | −104.92 |
| 10 | 49.789 | 16.19 | 1.43875 | 94.9 | 0.5343 | 60.59 | 87.74 |
| 11 | −154.633 | 0.15 | | | | 61.47 | |
| 12 | 140.921 | 10.97 | 1.43387 | 95.1 | 0.5373 | 63.30 | 149.39 |
| 13 | −117.732 | 0.15 | | | | 63.43 | |
| 14 | 133.856 | 10.60 | 1.59522 | 67.7 | 0.5442 | 61.93 | 108.85 |
| 15 | −122.685 | (Variable) | | | | 61.02 | |
| 16 | 22.327 | 1.00 | 1.88299 | 40.8 | 0.5667 | 22.26 | −21.66 |
| 17 | 10.117 | 6.81 | | | | 17.48 | |
| 18 | −30.076 | 3.01 | 1.92286 | 18.9 | 0.6495 | 17.18 | 34.97 |
| 19 | −16.419 | 0.75 | 1.88299 | 40.8 | 0.5667 | 17.22 | −14.81 |
| 20 | 67.696 | 0.18 | | | | 17.19 | |
| 21 | 22.103 | 2.50 | 1.80809 | 22.8 | 0.6307 | 17.51 | 47.92 |
| 22 | 48.213 | (Variable) | | | | 17.40 | |
| 23 | −28.080 | 0.75 | 1.74319 | 49.3 | 0.5530 | 20.30 | −23.64 |
| 24 | 48.123 | 2.50 | 1.84649 | 23.9 | 0.6217 | 22.10 | 51.28 |
| 25 | −480.882 | (Variable) | | | | 22.60 | |
| 26 (Stop) | ∞ | 1.00 | | | | 27.32 | |
| 27 | 213.087 | 4.56 | 1.67789 | 50.7 | 0.5557 | 28.40 | 58.20 |
| 28 | −48.278 | 0.15 | | | | 29.00 | |
| 29 | 251.197 | 2.68 | 1.53171 | 48.8 | 0.5630 | 29.40 | 173.87 |
| 30 | −146.880 | 0.15 | | | | 29.40 | |
| 31 | 64.273 | 6.50 | 1.48749 | 70.2 | 0.5300 | 29.30 | 46.47 |
| 32 | −34.000 | 1.00 | 1.88299 | 40.8 | 0.5667 | 28.90 | −50.42 |
| 33 | −143.156 | 33.33 | | | | 29.00 | |
| 34 | 72.683 | 5.32 | 1.48749 | 70.2 | 0.5300 | 30.11 | 61.28 |
| 35 | −49.795 | 0.48 | | | | 29.91 | |
| 36 | −162.679 | 1.00 | 1.88299 | 40.8 | 0.5667 | 28.72 | −27.77 |
| 37 | 29.158 | 6.89 | 1.50127 | 56.5 | 0.5536 | 27.70 | 42.85 |
| 38 | −76.337 | 0.19 | | | | 27.75 | |
| 39 | 44.181 | 5.41 | 1.59240 | 68.3 | 0.5456 | 27.19 | 39.52 |
| 40 | −47.903 | 1.00 | 1.88299 | 40.8 | 0.5667 | 26.74 | −43.28 |
| 41 | 196.472 | 0.38 | | | | 26.12 | |
| 42 | 45.465 | 4.93 | 1.50127 | 56.5 | 0.5536 | 25.71 | 83.93 |
| 43 | −575.920 | 4.50 | | | | 25.10 | |
| 44 | ∞ | 33.00 | 1.60859 | 46.4 | 0.5664 | 40.00 | ∞ |
| 45 | ∞ | 13.20 | 1.51680 | 64.2 | 0.5347 | 40.00 | ∞ |
| 46 | ∞ | | | | | 40.00 | |
| Image plane | ∞ | | | | | | |

Aspherical surface data

First surface

K = −1.25859e+003   A4 = −8.38928e−008   A6 = 4.54912e−010   A8 = 4.22884e−014
A10 = 2.24001e−010   A12 = −2.29442e−020   A14 = 1.10046e−023   A16 = 1.10330e−028
A3 = 1.96408e−006   A5 = 3.38219e−008   A7 = −3.02637e−011   A9 = 1.27599e−015
A11 = −3.00102e−018   A13 = −8.30007e−023   A15 = −3.88796e−026

Eighth surface

K = −7.15484e+000   A4 = 7.25730e−007   A6 = 1.23088e−010   A8 = −4.16171e−013
A10 = −1.39659e−017   A12 = 1.45649e−020   A14 = 2.74632e−022   A16 = −1.10450e−025
A3 = 1.57431e−007   A5 = 1.61155e−009   A7 = 5.79687e−012   A9 = 1.11807e−014
A11 = −1.34539e−017   A13 = 1.33395e−021   A15 = −1.81734e−025

Various data
Zoom ratio 18.00

| | wide angle | Intermediate | Telephoto |
|---|---|---|---|
| Focal length | 6.00 | 25.44 | 108.00 |
| F number | 1.92 | 1.93 | 3.15 |
| Half angle of field | 42.51 | 12.20 | 2.92 |
| Image height | 5.50 | 5.50 | 5.50 |
| Entire lens length | 303.38 | 303.38 | 303.38 |
| BF | 11.05 | 11.05 | 11.05 |

-continued

| | | | |
|---|---|---|---|
| d15 | 0.90 | 34.06 | 47.76 |
| d22 | 49.20 | 10.18 | 7.86 |
| d25 | 6.52 | 12.38 | 1.00 |
| Entrance pupil position | 42.99 | 96.78 | 236.14 |
| Exit pupil position | 246373886.20 | 246373867.63 | 246373872.72 |
| Front principal point position | 48.99 | 122.22 | 344.14 |
| Rear principal point position | 5.05 | −14.39 | −96.95 |

Zoom lens unit data

| Unit | Leading surface | Focal length | Lens structure length | Front principal point position | Rear principal point position |
|---|---|---|---|---|---|
| 1 | 1 | 42.00 | 92.46 | 50.47 | 24.09 |
| 2 | 16 | −13.70 | 14.27 | 2.82 | −7.45 |
| 3 | 23 | −44.51 | 3.26 | −0.18 | −1.97 |
| 4 | 26 | 49.05 | 125.72 | 49.05 | −104.30 |

| Variable interval for forcusing | Infinity | 2.8 m away from surface R1 | Proximity (0.4 m away from surface R1) |
|---|---|---|---|
| d6 | 0.99 | 2.10 | 7.92 |
| d8 | 8.60 | 7.49 | 1.67 |

Numerical Embodiment 2

Surface data

| i-th surface | ri | di | ndi | vdi | θgFi | Effective diameter | Focal length |
|---|---|---|---|---|---|---|---|
| 1 | 139.466 | 2.97 | 1.80099 | 35.0 | 0.5863 | 87.78 | −77.64 |
| 2 | 42.802 | 22.86 | | | | 70.11 | |
| 3 | −143.970 | 2.10 | 1.77249 | 49.6 | 0.5521 | 70.01 | −145.10 |
| 4 | 520.766 | 2.18 | | | | 70.20 | |
| 5 | 95.567 | 5.51 | 1.94087 | 17.4 | 0.6775 | 71.40 | 196.99 |
| 6 | 189.094 | 1.28 | | | | 70.80 | |
| 7 | 203.867 | 8.52 | 1.51633 | 64.1 | 0.5352 | 70.55 | 173.67 |
| 8* | −158.851 | 11.68 | | | | 69.91 | |
| 9 | 108.617 | 2.10 | 1.84666 | 23.8 | 0.6205 | 63.93 | −125.61 |
| 10 | 53.522 | 14.47 | 1.43875 | 94.9 | 0.5343 | 61.65 | 91.52 |
| 11 | −148.989 | 0.15 | | | | 61.61 | |
| 12 | 140.481 | 8.58 | 1.43387 | 95.1 | 0.5373 | 60.08 | 160.61 |
| 13 | −136.400 | 0.15 | | | | 59.48 | |
| 14 | 71.351 | 8.84 | 1.59522 | 67.7 | 0.5442 | 55.69 | 100.89 |
| 15 | −370.020 | (Variable) | | | | 54.71 | |
| 16* | 30.322 | 1.00 | 1.77249 | 49.6 | 0.5521 | 23.22 | −21.53 |
| 17 | 10.620 | 7.27 | | | | 17.85 | |
| 18 | −21.992 | 4.09 | 1.80809 | 22.8 | 0.6307 | 17.34 | 26.04 |
| 19 | −11.714 | 0.75 | 1.88299 | 40.8 | 0.5667 | 17.35 | −16.31 |
| 20 | −63.014 | 0.18 | | | | 17.70 | |
| 21 | 19.747 | 1.79 | 1.84666 | 23.8 | 0.6205 | 17.45 | 137.05 |
| 22 | 22.756 | (Variable) | | | | 17.10 | |
| 23 | −25.317 | 0.75 | 1.74319 | 49.3 | 0.5530 | 20.30 | −21.65 |
| 24 | 45.343 | 2.54 | 1.84649 | 23.9 | 0.6217 | 22.10 | 49.03 |
| 25 | −539.401 | (Variable) | | | | 22.60 | |
| 26 (Stop) | ∞ | 1.00 | | | | 30.61 | |
| 27 | 236.053 | 5.02 | 1.65844 | 50.9 | 0.5561 | 31.82 | 62.08 |
| 28 | −49.299 | 0.15 | | | | 32.49 | |
| 29 | 493.345 | 3.46 | 1.53171 | 48.8 | 0.5630 | 33.10 | 139.21 |
| 30 | −87.374 | 0.15 | | | | 33.26 | |
| 31 | 62.611 | 7.41 | 1.48749 | 70.2 | 0.5300 | 33.05 | 50.67 |
| 32 | −39.433 | 1.00 | 1.88299 | 40.8 | 0.5667 | 32.70 | −47.93 |
| 33 | −541.390 | 37.24 | | | | 32.82 | |
| 34 | 115.411 | 5.87 | 1.50127 | 56.5 | 0.5536 | 32.87 | 72.71 |
| 35 | −52.694 | 0.48 | | | | 32.67 | |
| 36 | −208.518 | 1.00 | 1.88299 | 40.8 | 0.5667 | 31.42 | −31.08 |
| 37 | 31.892 | 7.12 | 1.50127 | 56.5 | 0.5536 | 30.39 | 44.06 |
| 38 | −67.401 | 0.19 | | | | 30.45 | |
| 39 | 50.092 | 6.18 | 1.43875 | 94.9 | 0.5343 | 29.70 | 55.95 |
| 40 | −46.560 | 1.00 | 1.88299 | 40.8 | 0.5667 | 29.20 | −48.04 |
| 41 | 515.559 | 0.38 | | | | 28.94 | |
| 42 | 42.390 | 5.02 | 1.50127 | 56.5 | 0.5536 | 28.71 | 66.41 |
| 43 | −151.923 | 4.50 | | | | 28.16 | |
| 44 | ∞ | 33.00 | 1.60859 | 46.4 | 0.5664 | 40.00 | ∞ |

-continued

| | | | | | | | |
|---|---|---|---|---|---|---|---|
| 45 | ∞ | 13.20 | 1.51680 | 64.2 | 0.5347 | 40.00 | ∞ |
| 46 | ∞ | | | | | 40.00 | |
| Image plane | ∞ | | | | | | |

Aspherical surface data

Eighth surface

K = −1.45527e+001   A4 = 2.17481e−007   A6 = 6.17762e−011   A8 = 6.40744e−015
A10 = −2.90221e−016   A12 = 5.55553e−022   A14 = 1.73124e−022   A16 = −6.91961e−026
A3 = 8.42467e−007   A5 = −3.13911e−009   A7 = 1.93241e−012   A9 = 1.19506e−015
A11 = 1.05023e−018   A13 = 2.87234e−021   A15 = −2.47382e−024

Sixteenth surface

K = 3.07867e+000   A4 = −2.86607e−006   A6 = 7.44419e−008   A8 = −4.40751e−009
A10 = −2.32067e−011   A12 = 2.46229e−013   A14 = −2.08883e−015   A16 = 2.73272e−018
A3 = 4.84892e−005   A5 = −1.47193e−006   A7 = 3.05669e−008   A9 = 7.08842e−011
A11 = 2.51171e−012   A13 = −1.08921e−014   A15 = 6.18019e−017

Various data
zoom ratio 24.00

| | Wide angle | Intermediate | Telephoto |
|---|---|---|---|
| Focal length | 6.20 | 30.32 | 148.80 |
| F number | 1.86 | 1.86 | 4.33 |
| Half angle of field | 41.58 | 10.28 | 2.12 |
| Image height | 5.50 | 5.50 | 5.50 |
| Entire lens length | 319.88 | 319.88 | 319.88 |
| BF | 16.94 | 16.94 | 16.94 |
| d15 | 0.90 | 33.62 | 45.10 |
| d22 | 46.36 | 9.51 | 13.61 |
| d25 | 12.45 | 16.58 | 1.00 |
| Entrance pupil position | 50.13 | 123.03 | 357.03 |
| Exit pupil position | 1552.95 | 1552.95 | 1552.95 |
| Front principal point position | 56.35 | 153.95 | 520.24 |
| Rear principal point position | 10.74 | −13.38 | −131.86 |

Zoom lens unit data

| Unit | Leading surface | Focal length | Lens structure length | Front principal point position | Rear principal point position |
|---|---|---|---|---|---|
| 1 | 1 | 42.06 | 91.43 | 54.43 | 19.63 |
| 2 | 16 | −13.50 | 15.09 | 2.76 | −8.22 |
| 3 | 23 | −39.34 | 3.30 | −0.15 | −1.96 |
| 4 | 26 | 57.69 | 133.41 | 59.75 | −120.15 |

| Variable interval for forcusing | Infinity | 2.8 m away from surface R1 | proximity (0.4 m away from surface R1) |
|---|---|---|---|
| d6 | 1.28 | 3.18 | 12.77 |
| d8 | 11.68 | 9.78 | 0.19 |

Numerical Embodiment 3

Surface data

| i-th surface | ri | di | ndi | vdi | θgFi | Effective diameter | Focal length |
|---|---|---|---|---|---|---|---|
| 1 | 151.483 | 4.70 | 1.77249 | 49.6 | 0.5521 | 185.86 | −325.91 |
| 2 | 93.463 | 54.62 | | | | 158.63 | |
| 3 | −473.026 | 4.50 | 1.80400 | 46.6 | 0.5572 | 155.17 | −220.91 |
| 4 | 287.959 | 0.15 | | | | 149.87 | |
| 5 | 170.429 | 7.32 | 1.922.86 | 18.9 | 0.6495 | 149.67 | 853.36 |
| 6 | 212.264 | 11.53 | | | | 148.09 | |
| 7 | 774.767 | 20.53 | 1.43387 | 95.1 | 0.5373 | 147.69 | 359.69 |
| 8 | −194.462 | 0.20 | | | | 147.14 | |
| 9 | 668.779 | 4.40 | 1.80000 | 29.8 | 0.6017 | 133.42 | −220.76 |
| 10 | 140.174 | 22.07 | 1.45599 | 90.3 | 0.5340 | 125.47 | 225.76 |
| 11 | −372.165 | 58.54 | | | | 124.70 | |
| 12 | −789.112 | 10.52 | 1.43387 | 95.1 | 0.5373 | 119.65 | 618.79 |
| 13 | −201.507 | 0.15 | | | | 120.56 | |

-continued

| | | | | | | | |
|---|---|---|---|---|---|---|---|
| 14 | 354.789 | 17.36 | 1.49699 | 81.5 | 0.5374 | 121.98 | 255.19 |
| 15 | −195.067 | 0.15 | | | | 121.86 | |
| 16 | 139.448 | 8.11 | 1.62041 | 60.3 | 0.5426 | 112.53 | 438.77 |
| 17 | 278.370 | (Variable) | | | | 111.40 | |
| 18 | −235.858 | 1.50 | 1.77249 | 49.6 | 0.5521 | 39.18 | −67.04 |
| 19 | 66.960 | 7.22 | | | | 37.63 | |
| 20 | −55.511 | 2.00 | 1.77249 | 49.6 | 0.5521 | 37.51 | −61.37 |
| 21 | 341.403 | 4.96 | | | | 38.99 | |
| 22 | −59.175 | 1.50 | 1.83480 | 42.7 | 0.5642 | 39.56 | −52.21 |
| 23 | 170.960 | 11.58 | 1.80518 | 25.4 | 0.6161 | 43.51 | 37.88 |
| 24 | −36.409 | 0.15 | | | | 45.05 | |
| 25 | −43.367 | 1.50 | 1.85025 | 32.3 | 0.5929 | 44.99 | −85.45 |
| 26 | −108.120 | (Variable) | | | | 47.66 | |
| 27 | 109.469 | 10.16 | 1.60311 | 60.6 | 0.5414 | 52.63 | 92.99 |
| 28* | −111.878 | 0.20 | | | | 53.01 | |
| 29 | −269.420 | 5.64 | 1.60311 | 60.6 | 0.5414 | 52.84 | 334.77 |
| 30 | −116.587 | 0.20 | | | | 53.11 | |
| 31 | 125.919 | 2.00 | 1.84666 | 23.8 | 0.6205 | 52.13 | −104.24 |
| 32 | 51.808 | 10.32 | 1.63999 | 60.1 | 0.5370 | 50.48 | 94.44 |
| 33 | 326.649 | 0.20 | | | | 49.63 | |
| 34 | 96.325 | 6.42 | 1.60311 | 60.6 | 0.5414 | 49.15 | 175.75 |
| 35 | 990.483 | (Variable) | | | | 48.02 | |
| 36 (Stop) | ∞ | 3.55 | | | | 30.33 | |
| 37 | −67.968 | 1.50 | 1.72915 | 54.7 | 0.5444 | 29.15 | −31.15 |
| 38 | 34.667 | 6.26 | 1.84666 | 23.8 | 0.6205 | 28.32 | 68.64 |
| 39 | 77.647 | 4.74 | | | | 27.50 | |
| 40 | −44.403 | 1.80 | 1.80609 | 40.9 | 0.5701 | 27.45 | −37.65 |
| 41 | 99.465 | 16.17 | 1.78472 | 25.7 | 0.6161 | 28.80 | 44.39 |
| 42 | −50.460 | 27.97 | | | | 32.22 | |
| 43 | −64.859 | 1.80 | 1.69679 | 55.5 | 0.5433 | 31.19 | −41.15 |
| 44 | 52.386 | 7.62 | 1.50137 | 56.4 | 0.5533 | 32.33 | 44.46 |
| 45 | −37.191 | 0.20 | | | | 32.71 | |
| 46 | 486.946 | 1.80 | 1.83400 | 37.2 | 0.5775 | 32.55 | −48.61 |
| 47 | 37.584 | 6.77 | 1.49699 | 81.5 | 0.5374 | 32.29 | 54.25 |
| 48 | −90.618 | 0.20 | | | | 32.55 | |
| 49 | 180.834 | 7.10 | 1.49699 | 81.5 | 0.5374 | 32.68 | 53.96 |
| 50 | −31.185 | 1.80 | 1.80000 | 29.8 | 0.6017 | 32.64 | −64.75 |
| 51 | −79.429 | 0.50 | | | | 33.50 | |
| 52 | 60.980 | 7.57 | 1.48749 | 70.2 | 0.5300 | 33.45 | 58.37 |
| 53 | −51.501 | 5.00 | | | | 32.96 | |
| 54 | ∞ | 33.00 | 1.60859 | 46.4 | 0.5664 | 60.00 | ∞ |
| 55 | ∞ | 13.20 | 1.51633 | 64.2 | 0.5352 | 60.00 | ∞ |
| 56 | ∞ | | | | | 60.00 | |
| Image plane | ∞ | | | | | | |

Aspherical surface data
Twenty-eighth surface

K = −1.97208e+001  A4 = −1.18953e−006  A6 = 1.14482e−009  A8 = −6.00249e−013
A10 = 3.28185e−016  A12 = −5.28100e−020
A3 = −2.65793e−007  A5 = 4.53173e−010  A7 = 4.88497e−014  A9 = −6.15629e−015
A11 = 1.51300e−018

Various data
Zoom ratio 18.50

| | Wide angle | Intermediate | Telephoto |
|---|---|---|---|
| Focal length | 7.20 | 31.78 | 133.20 |
| F number | 1.54 | 1.54 | 1.85 |
| Half angle of field | 37.38 | 9.82 | 2.36 |
| Image height | 5.50 | 5.50 | 5.50 |
| Entire lens length | 606.40 | 606.40 | 606.40 |
| BF | 12.20 | 12.20 | 12.20 |
| d17 | 6.52 | 76.52 | 106.77 |
| d26 | 146.43 | 60.48 | 1.99 |
| d35 | 2.15 | 18.11 | 46.35 |
| Entrance pupil position | 133.16 | 233.11 | 554.31 |
| Exit pupil position | 89.01 | 89.01 | 89.01 |
| Front principal point position | 141.04 | 278.05 | 918.50 |
| Rear principal point position | 5.00 | −19.58 | −121.00 |

Zoom lens unit data

| Unit | Leading surface | Focal length | Lens structure length | Front principal point position | Rear principal point position |
|---|---|---|---|---|---|
| 1 | 1 | 103.68 | 224.92 | 152.84 | 59.27 |
| 2 | 18 | −29.50 | 30.42 | 2.76 | −21.32 |

-continued

| | | | | | |
|---|---|---|---|---|---|
| 3 | 27 | 52.50 | 35.16 | 8.20 | −14.33 |
| 4 | 36 | 30.60 | 148.60 | 49.49 | 8.85 |

| Variable interval for forcusing | Infinity | 3.5 m away from surface R1 | Proximity (0.6 m away from surface R1) |
|---|---|---|---|
| d6 | 11.53 | 18.50 | 44.25 |
| d11 | 58.54 | 51.58 | 25.82 |

Numerical Embodiment 4

Surface data

| i-th surface | ri | di | ndi | vdi | θgFi | Effective diameter | Focal length |
|---|---|---|---|---|---|---|---|
| 1 | 149.405 | 4.70 | 1.80099 | 35.0 | 0.5863 | 182.26 | −309.13 |
| 2 | 92.106 | 52.38 | | | | 155.69 | |
| 3 | −419.430 | 4.50 | 1.74339 | 44.8 | 0.5655 | 153.83 | −198.51 |
| 4 | 230.902 | 0.15 | | | | 148.04 | |
| 5 | 168.005 | 10.46 | 1.94087 | 17.4 | 0.6775 | 148.44 | 552.17 |
| 6 | 239.255 | 13.37 | | | | 146.43 | |
| 7 | 612.152 | 22.14 | 1.43387 | 95.1 | 0.5373 | 144.99 | 349.15 |
| 8 | −199.762 | 0.20 | | | | 143.95 | |
| 9 | 582.964 | 4.40 | 1.80000 | 29.8 | 0.6017 | 130.73 | −220.91 |
| 10 | 135.978 | 23.97 | 1.45599 | 90.3 | 0.5340 | 122.84 | 229.89 |
| 11 | −437.361 | 52.78 | | | | 120.78 | |
| 12 | −993.294 | 9.49 | 1.43387 | 95.1 | 0.5373 | 120.52 | 622.70 |
| 13 | −213.435 | 0.15 | | | | 121.14 | |
| 14 | 381.537 | 20.01 | 1.49699 | 81.5 | 0.5374 | 122.54 | 257.86 |
| 15 | −190.447 | 0.15 | | | | 122.33 | |
| 16 | 138.193 | 8.22 | 1.62041 | 60.3 | 0.5426 | 112.88 | 433.89 |
| 17 | 276.340 | (Variable) | | | | 111.75 | |
| 18 | −247.164 | 1.50 | 1.77249 | 49.6 | 0.5521 | 39.17 | −62.23 |
| 19 | 60.195 | 7.94 | | | | 37.52 | |
| 20 | −49.578 | 2.00 | 1.77249 | 49.6 | 0.5521 | 37.46 | −61.96 |
| 21 | 1635.970 | 4.36 | | | | 39.32 | |
| 22 | −62.443 | 1.50 | 1.81600 | 46.6 | 0.5568 | 39.91 | −63.71 |
| 23 | 323.894 | 10.55 | 1.80518 | 25.4 | 0.6161 | 43.42 | 40.88 |
| 24 | −36.483 | 0.15 | | | | 44.79 | |
| 25 | −43.726 | 1.50 | 1.85025 | 32.3 | 0.5929 | 44.75 | −86.04 |
| 26 | −109.220 | (Variable) | | | | 47.37 | |
| 27 | 115.247 | 10.16 | 1.60311 | 60.6 | 0.5414 | 52.26 | 95.64 |
| 28* | −112.526 | 0.20 | | | | 52.71 | |
| 29 | −323.757 | 5.64 | 1.60311 | 60.6 | 0.5414 | 52.56 | 337.60 |
| 30 | −126.125 | 0.20 | | | | 52.78 | |
| 31 | 144.643 | 2.00 | 1.84666 | 23.8 | 0.6205 | 52.03 | −107.32 |
| 32 | 55.789 | 10.32 | 1.63999 | 60.1 | 0.5370 | 50.64 | 96.11 |
| 33 | 535.428 | 0.20 | | | | 49.92 | |
| 34 | 98.352 | 6.42 | 1.60311 | 60.6 | 0.5414 | 49.42 | 167.90 |
| 35 | 2945.798 | (Variable) | | | | 48.38 | |
| 36 (Stop) | ∞ | 3.55 | | | | 30.62 | |
| 37 | −67.619 | 1.50 | 1.72915 | 54.7 | 0.5444 | 29.47 | −32.63 |
| 38 | 37.306 | 6.34 | 1.84666 | 23.8 | 0.6205 | 28.68 | 76.19 |
| 39 | 80.459 | 4.77 | | | | 27.84 | |
| 40 | −44.494 | 1.80 | 1.80609 | 40.9 | 0.5701 | 27.80 | −37.54 |
| 41 | 98.083 | 15.67 | 1.78472 | 25.7 | 0.6161 | 29.21 | 43.27 |
| 42 | −43.958 | 28.17 | | | | 32.52 | |
| 43 | −64.087 | 1.80 | 1.69679 | 55.5 | 0.5433 | 31.15 | −40.49 |
| 44 | 51.397 | 7.73 | 1.50137 | 56.4 | 0.5533 | 32.27 | 44.17 |
| 45 | −37.229 | 0.20 | | | | 32.67 | |
| 46 | 476.070 | 1.80 | 1.83400 | 37.2 | 0.5775 | 32.50 | −48.50 |
| 47 | 37.438 | 6.85 | 1.49699 | 81.5 | 0.5374 | 32.22 | 53.90 |
| 48 | −89.373 | 0.20 | | | | 32.49 | |
| 49 | 194.903 | 7.05 | 1.49699 | 81.5 | 0.5374 | 32.60 | 54.28 |
| 50 | −31.041 | 1.80 | 1.80000 | 29.8 | 0.6017 | 32.56 | −64.06 |
| 51 | −79.799 | 0.50 | | | | 33.42 | |
| 52 | 60.650 | 7.56 | 1.48749 | 70.2 | 0.5300 | 33.39 | 58.00 |
| 53 | −51.136 | 5.00 | | | | 32.91 | |
| 54 | ∞ | 33.00 | 1.60859 | 46.4 | 0.5664 | 60.00 | ∞ |

-continued

| | | | | | | | |
|---|---|---|---|---|---|---|---|
| 55 | ∞ | 13.20 | 1.51633 | 64.2 | 0.5352 | 60.00 | ∞ |
| 55 | ∞ | | | | | 60.00 | |
| Image plane | ∞ | | | | | | |

Aspherical surface data
Twenty-eighth surface

K = −1.97208e+001   A4 = −1.20648e−006   A6 = 1.15627e−009   A8 = −5.89069e−013
A10 = 2.94176e−016   A12 = −1.55822e−020
A3 = −2.02029e−007   A5 = −2.98022e−011   A7 = −1.19356e−012   A9 = −4.60664e−01
A11 = 3.20284e−019

Various data
Zoom ratio 18.50

| | Wide angle | Intermediate | Telephoto |
|---|---|---|---|
| Focal length | 7.20 | 31.78 | 133.20 |
| F number | 1.54 | 1.54 | 1.85 |
| Half angle of field | 37.38 | 9.82 | 2.36 |
| Image height | 5.50 | 5.50 | 5.50 |
| Entire lens length | 608.08 | 608.08 | 608.08 |
| BF | 12.12 | 12.12 | 12.12 |
| d17 | 7.08 | 77.08 | 107.33 |
| d26 | 146.43 | 60.48 | 1.99 |
| d35 | 2.15 | 18.11 | 46.35 |
| Entrance pupil position | 131.36 | 231.10 | 548.65 |
| Exit pupil position | 90.90 | 90.90 | 90.90 |
| Front principal point position | 139.21 | 275.70 | 907.06 |
| Rear principal point position | 4.92 | −19.66 | −121.08 |

Zoom lens unit data

| Unit | Leading surface | Focal length | Lens structure length | Front principal point position | Rear principal point position |
|---|---|---|---|---|---|
| 1 | 1 | −139.74 | 72.19 | 32.84 | −25.64 |
| 2 | 7 | 368.62 | 50.72 | 16.58 | −18.48 |
| 3 | 12 | 129.54 | 38.03 | 14.20 | −11.22 |
| 4 | 18 | −29.50 | 29.51 | 2.75 | −20.70 |
| 5 | 27 | 52.50 | 35.16 | 8.81 | −13.84 |
| 6 | 36 | 31.06 | 148.53 | 49.93 | 8.72 |

| Variable interval for focusing | Infinity | 3.5 m away from surface R1 | Proximity (0.6 m away from surface R1) |
|---|---|---|---|
| d6 | 13.37 | 20.18 | 45.46 |
| d11 | 52.77 | 45.97 | 20.69 |

Numerical Embodiment 5

Surface data

| i-th surface | ri | di | ndi | vdi | θgFi | Effective diameter | Focal length |
|---|---|---|---|---|---|---|---|
| 1* | 2590.919 | 4.70 | 1.74399 | 44.8 | 0.5655 | 156.91 | −136.32 |
| 2 | 98.027 | 33.69 | | | | 132.16 | |
| 3 | −305.776 | 4.50 | 1.74399 | 44.8 | 0.5655 | 131.89 | −573.78 |
| 4 | −1070.252 | 0.15 | | | | 132.06 | |
| 5 | 170.788 | 7.21 | 1.94087 | 17.4 | 0.6775 | 131.12 | 737.87 |
| 6 | 220.893 | 9.04 | | | | 129.48 | |
| 7 | 382.168 | 19.43 | 1.43387 | 95.1 | 0.5373 | 128.25 | 317.72 |
| 8 | −213.140 | 0.20 | | | | 127.03 | |
| 9 | 390.016 | 4.40 | 1.80000 | 29.8 | 0.6017 | 116.31 | −221.56 |
| 10 | 121.910 | 18.41 | 1.45599 | 90.3 | 0.5340 | 109.26 | 222.57 |
| 11 | −586.465 | 38.27 | | | | 108.05 | |
| 12 | −646.357 | 8.18 | 1.43387 | 95.1 | 0.5373 | 119.51 | 755.90 |
| 13 | −218.767 | 0.15 | | | | 120.18 | |
| 14 | 318.623 | 20.33 | 1.49699 | 81.5 | 0.5374 | 122.16 | 246.22 |
| 15 | −195.394 | 0.15 | | | | 121.97 | |
| 16 | 131.275 | 9.12 | 1.62041 | 60.3 | 0.5426 | 112.74 | 407.89 |
| 17 | 264.376 | (Variable) | | | | 111.32 | |
| 18 | 651.688 | 1.50 | 1.80400 | 46.6 | 0.5572 | 38.50 | −55.79 |
| 19 | 42.126 | 10.81 | | | | 36.30 | |

-continued

| | | | | | | | |
|---|---|---|---|---|---|---|---|
| 20 | −32.950 | 2.00 | 1.80400 | 46.6 | 0.5572 | 36.31 | −58.52 |
| 21 | −111.576 | 3.36 | | | | 39.53 | |
| 22 | −50.260 | 1.50 | 1.81600 | 46.6 | 0.5568 | 40.22 | −73.58 |
| 23 | −304.592 | 9.78 | 1.80518 | 25.4 | 0.6161 | 44.14 | 47.09 |
| 24 | −34.489 | 0.15 | | | | 45.69 | |
| 25 | −47.142 | 1.50 | 1.83400 | 37.2 | 0.5775 | 46.08 | −118.90 |
| 26 | −90.643 | (Variable) | | | | 48.47 | |
| 27 | 116.559 | 8.09 | 1.60311 | 60.6 | 0.5414 | 53.72 | 97.47 |
| 28* | −116.415 | 0.20 | | | | 53.93 | |
| 29 | 288.931 | 5.10 | 1.60311 | 60.6 | 0.5414 | 53.72 | 193.48 |
| 30 | −195.738 | 0.20 | | | | 53.60 | |
| 31 | 164.757 | 2.00 | 1.75519 | 27.5 | 0.6103 | 52.47 | −69.84 |
| 32 | 40.003 | 9.44 | 1.63853 | 55.4 | 0.5485 | 49.93 | 79.57 |
| 33 | 168.016 | 0.20 | | | | 49.41 | |
| 34 | 89.418 | 7.42 | 1.62041 | 60.3 | 0.5426 | 49.14 | 150.38 |
| 35 | 1906.450 | (Variable) | | | | 47.87 | |
| 36 (Stop) | ∞ | 3.55 | | | | 30.13 | |
| 37 | −75.399 | 1.50 | 1.72915 | 54.7 | 0.5444 | 28.83 | −24.86 |
| 38 | 24.212 | 4.73 | 1.84666 | 23.8 | 0.6205 | 27.69 | 40.88 |
| 39 | 71.677 | 5.08 | | | | 27.29 | |
| 40 | −39.628 | 1.80 | 1.74399 | 44.8 | 0.5655 | 27.14 | −36.33 |
| 41 | 88.188 | 14.62 | 1.73799 | 32.3 | 0.5899 | 28.46 | 49.45 |
| 42 | −58.581 | 20.51 | | | | 31.29 | |
| 43 | −69.696 | 1.80 | 1.69679 | 55.5 | 0.5433 | 31.83 | −54.64 |
| 44 | 85.624 | 10.25 | 1.50137 | 56.4 | 0.5533 | 32.92 | 52.89 |
| 45 | −37.107 | 0.20 | | | | 34.21 | |
| 46 | 207.714 | 1.80 | 1.83400 | 37.2 | 0.5775 | 33.82 | −59.09 |
| 47 | 39.880 | 10.09 | 1.49699 | 81.5 | 0.5374 | 33.26 | 54.23 |
| 48 | −76.854 | 0.20 | | | | 33.56 | |
| 49 | 120.686 | 9.69 | 1.49699 | 81.5 | 0.5374 | 33.15 | 45.97 |
| 50 | −27.528 | 1.80 | 1.83400 | 37.2 | 0.5775 | 32.58 | −43.61 |
| 51 | −114.287 | 0.50 | | | | 33.34 | |
| 52 | 80.240 | 6.87 | 1.49699 | 81.5 | 0.5374 | 33.32 | 59.11 |
| 53 | −45.236 | 5.00 | | | | 33.02 | |
| 54 | ∞ | 33.00 | 1.60859 | 46.4 | 0.5664 | 60.00 | ∞ |
| 55 | ∞ | 13.20 | 1.51633 | 64.2 | 0.5352 | 60.00 | ∞ |
| 56 | ∞ | | | | | 60.00 | |
| Image plane | ∞ | | | | | | |

Aspherical surface data

First surface

K = −1.94940+001   A4 = 3.37466e−009   A6 = −1.24645e−011   A8 = 4.11242e−016
A10 = −3.00083e−019   A12 = 1.55028e−024
A3 = −4.12463e−008   A5 = 9.25913e−010   A7 = 4.86300e−014   A9 = 1.34678e−017
A11 = 1.20303e−021

Twenty-eighth surface

K = −1.97208e+001   A4 = −1.01152e−006   A6 = 1.09101e−009   A8 = −5.26261e−013
A10 = 2.80516e−016   A12 = 8.91198e−020
A3 = −1.06351e−006   A5 = −5.93506e−009   A7 = 3.69693e−013   A9 = −3.16897e−015
A11 = −4.98782e−018

Various data
Zoom ratio 18.50

| | Wide angle | Intermediate | Telephoto |
|---|---|---|---|
| Focal length | 7.20 | 31.78 | 133.20 |
| F number | 1.54 | 1.54 | 1.85 |
| Half angle of field | 37.38 | 9.82 | 2.36 |
| Image height | 5.50 | 5.50 | 5.50 |
| Entire lens length | 553.95 | 553.95 | 553.95 |
| BF | 11.92 | 11.92 | 11.92 |
| d17 | 5.94 | 75.94 | 106.19 |
| d26 | 146.46 | 60.50 | 2.01 |
| d35 | 2.15 | 18.11 | 46.35 |
| Entrance pupil position | 95.67 | 195.77 | 519.64 |
| Exit pupil position | 101.30 | 101.30 | 101.30 |
| Front principal point position | 103.45 | 238.86 | 851.35 |
| Rear principal point position | 4.72 | −19.86 | −121.28 |

-continued

| Zoom lens unit data | | | | | |
|---|---|---|---|---|---|
| Unit | Leading surface | Focal length | Lens structure length | Front principal point position | Rear principal point position |
| 1 | 1 | 103.68 | 177.96 | 115.34 | 58.40 |
| 2 | 18 | −29.50 | 30.62 | 2.46 | −23.43 |
| 3 | 27 | 52.50 | 32.66 | 6.05 | −14.69 |
| 4 | 36 | 32.06 | 146.24 | 48.96 | 8.42 |

| Variable interval for focusing | Infinity | 3.5 m away from surface R1 | Proximity (0.6 m away from surface R1) |
|---|---|---|---|
| d6 | 9.04 | 14.42 | 35.59 |
| d11 | 38.27 | 32.88 | 11.71 |

TABLE 1

Corresponding values of conditional expressions in Numerical Embodiments 1 to 5

| Number of expression | Expression | Numerical Embodiment | | | | |
|---|---|---|---|---|---|---|
| | | 1 | 2 | 3 | 4 | 5 |
| (1) | $(\theta 11p - \theta 11n)/(\nu 11p - \nu 11n)$ | −0.00344 | −0.00435 | −0.00325 | −0.00452 | −0.00409 |
| (2) | $f11cp/f1$ | −4.19 | −2.99 | −6.05 | −3.95 | −5.84 |
| (3) | $\nu 11p - \nu 11n$ | 30.64 | 28.44 | 28.16 | 22.48 | 27.38 |
| (4) | $fT/f1$ | 2.57 | 3.54 | 1.28 | 1.28 | 1.28 |
| (5) | $(\theta 2p - \theta 2n)/(\nu 2p - \nu 2n)$ | −0.00368 | −0.00302 | −0.00280 | −0.00276 | −0.00287 |
| | $-7.5 \times 10^{-4} \times fT/f1$ $-2.0 \times 10^{-3}$ | −0.00393 | −0.00465 | −0.00296 | −0.00296 | −0.00296 |
| (6) | $\{(\theta 42p - \theta 42n)/(\nu 42p - \nu 42n)\}/\{(\theta 43p - \theta 43n)/(\nu 43p - \nu 43n)\}$ | | | 2.752 | 2.752 | 2.514 |
| (7) | $\{(\theta 4ap - \theta 4an)/(\nu 4ap - \nu 4an)\}/\{(\theta 4bp - \theta 4bn)/(\nu 4bp - \nu 4bn)\}$ | 1.137 | 1.509 | | | |
| | f1 | −52.91 | −65.86 | −141.17 | −139.74 | −126.29 |
| | $(\theta 42p - \theta 42n)/(\nu 42p - \nu 42n)$ | | | −0.00302 | −0.00302 | −0.00195 |
| | $(\theta 43p - \theta 43n)/(\nu 43p - \nu 43n)$ | | | −0.00110 | −0.00110 | −0.00077 |
| | $(\theta 4ap - \theta 4an)/(\nu 4ap - \nu 4an)$ | −0.00108 | −0.00107 | | | |
| | $(\theta 4bp - \theta 4bn)/(\nu 4bp - \nu 4bn)$ | −0.00095 | −0.00071 | | | |

TABLE 2

Corresponding values of hW_i, HW_i, hT_i, and HT_i of each surface of front first lens unit and second lens unit, and the expression (19) in Numerical Embodiment 1

| Lens unit number | Surface number | hW_i | HW_i | hT_i | HT_i | Expression (19) |
|---|---|---|---|---|---|---|
| Front first lens unit | 1 | 1.000 | −7.165 | 18.000 | −2.187 | −0.100 |
| | 2 | 0.999 | −6.887 | 17.985 | −2.170 | −0.100 |
| | 3 | 1.374 | −6.275 | 24.733 | −2.806 | −0.100 |
| | 4 | 1.401 | −6.255 | 25.217 | −2.853 | −0.100 |
| | 5 | 1.426 | −6.247 | 25.661 | −2.897 | −0.100 |
| | 6 | 1.450 | −6.009 | 26.092 | −2.926 | −0.100 |
| Second lens unit | 16 | 1.552 | −1.930 | 7.856 | −0.531 | −0.020 |
| | 17 | 1.507 | −1.817 | 7.464 | −0.493 | −0.018 |
| | 18 | 1.825 | −1.447 | 6.878 | −0.303 | 0.013 |

TABLE 2-continued

Corresponding values of hW_i, HW_i, hT_i, and HT_i of each surface of front first lens unit and second lens unit, and the expression (19) in Numerical Embodiment 1

| Lens unit number | Surface number | hW_i | HW_i | hT_i | HT_i | Expression (19) |
|---|---|---|---|---|---|---|
| | 19 | 1.987 | −1.433 | 7.078 | −0.273 | 0.020 |
| | 20 | 2.026 | −1.428 | 7.121 | −0.266 | 0.021 |
| | 21 | 2.048 | −1.429 | 7.157 | −0.263 | 0.022 |
| | 22 | 2.115 | −1.363 | 7.070 | −0.228 | 0.028 |

TABLE 3

Corresponding values of hW_i, HW_i, hT_i, and HT_i of each surface of front first lens unit and second lens unit, and the expression (19) in Numerical Embodiment 2

| Lens unit number | Surface number | hW_i | HW_i | hT_i | HT_i | Expression (19) |
|---|---|---|---|---|---|---|
| Front first lens unit | 1 | 1.000 | −8.085 | 24.000 | −2.399 | −0.086 |
| | 2 | 0.990 | −7.743 | 23.772 | −2.366 | −0.086 |
| | 3 | 1.285 | −6.322 | 30.839 | −2.914 | −0.086 |
| | 4 | 1.308 | −6.289 | 31.401 | −2.961 | −0.086 |
| | 5 | 1.356 | −6.248 | 32.543 | −3.057 | −0.086 |
| | 6 | 1.379 | −6.019 | 33.101 | −3.095 | −0.086 |
| Second lens unit | 16 | 1.445 | −2.018 | 9.466 | −0.631 | −0.035 |
| | 17 | 1.411 | −1.907 | 9.008 | −0.591 | −0.033 |
| | 18 | 1.719 | −1.492 | 7.882 | −0.387 | −0.008 |
| | 19 | 1.959 | −1.489 | 8.193 | −0.356 | 0.000 |
| | 20 | 2.006 | −1.492 | 8.268 | −0.351 | 0.001 |
| | 21 | 2.022 | −1.489 | 8.281 | −0.348 | 0.002 |
| | 22 | 2.024 | −1.414 | 8.004 | −0.318 | 0.005 |

TABLE 4

Corresponding values of hW_i, HW_i, hT_i, and HT_i of each surface of front first lens unit and second lens unit, and the expression (19) in Numerical Embodiment 3

| Lens unit number | Surface number | hW_i | HW_i | hT_i | HT_i | Expression (19) |
|---|---|---|---|---|---|---|
| Front first lens unit | 1 | 1.000 | −18.495 | 18.500 | −4.161 | −0.171 |
| | 2 | 0.986 | −17.877 | 18.249 | −4.085 | −0.171 |
| | 3 | 1.154 | −13.222 | 21.351 | −4.364 | −0.171 |
| | 4 | 1.167 | −13.066 | 21.583 | −4.395 | −0.171 |
| | 5 | 1.168 | −13.062 | 21.606 | −4.399 | −0.171 |
| | 6 | 1.175 | −12.693 | 21.740 | −4.401 | −0.171 |
| Second lens unit | 18 | 1.509 | −3.203 | 10.026 | −1.277 | −0.081 |
| | 19 | 1.505 | −3.117 | 9.903 | −1.249 | −0.080 |
| | 20 | 1.597 | −2.641 | 9.682 | −1.120 | −0.073 |
| | 21 | 1.637 | −2.608 | 9.799 | −1.118 | −0.072 |
| | 22 | 1.829 | −2.494 | 10.430 | −1.119 | −0.067 |
| | 23 | 1.882 | −2.505 | 10.654 | −1.132 | −0.067 |
| | 24 | 2.298 | −2.586 | 12.422 | −1.237 | −0.063 |
| | 25 | 2.300 | −2.579 | 12.421 | −1.235 | −0.063 |
| | 26 | 2.348 | −2.584 | 12.619 | −1.246 | −0.063 |

TABLE 5

Corresponding values of hW_i, HW_i, hT_i and HT_i of each surface of front first lens unit and second lens unit, and the expression (19) in Numerical Embodiment 4

| Lens unit number | Surface number | hW_i | HW_i | hT_i | HT_i | Expression (19) |
|---|---|---|---|---|---|---|
| Front first lens unit | 1 | 1.000 | −18.244 | 18.500 | −4.119 | −0.170 |
| | 2 | 0.986 | −17.626 | 18.240 | −4.042 | −0.170 |
| | 3 | 1.155 | −13.277 | 21.375 | −4.337 | −0.170 |
| | 4 | 1.169 | −13.124 | 21.617 | −4.372 | −0.170 |
| | 5 | 1.170 | −13.121 | 21.653 | −4.376 | −0.170 |
| | 6 | 1.183 | −12.632 | 21.894 | −4.390 | −0.170 |
| Second lens unit | 18 | 1.509 | −3.200 | 10.024 | −1.261 | −0.080 |
| | 19 | 1.505 | −3.113 | 9.900 | −1.233 | −0.079 |
| | 20 | 1.620 | −2.618 | 9.747 | −1.103 | −0.070 |
| | 21 | 1.665 | −2.594 | 9.897 | −1.104 | −0.069 |
| | 22 | 1.842 | −2.506 | 10.499 | −1.110 | −0.066 |
| | 23 | 1.895 | −2.517 | 10.726 | −1.123 | −0.065 |
| | 24 | 2.273 | −2.592 | 12.334 | −1.216 | −0.062 |
| | 25 | 2.275 | −2.585 | 12.334 | −1.214 | −0.062 |
| | 26 | 2.323 | −2.590 | 12.530 | −1.224 | −0.062 |

TABLE 6

Corresponding values of hW_i, HW_i, hT_i, and HT_i of each surface of front first lens unit and second lens unit, and the expression (19) in Numerical Embodiment 5

| Lens unit number | Surface number | hW_i | HW_i | hT_i | HT_i | Expression (19) |
|---|---|---|---|---|---|---|
| Front first lens unit | 1 | 1.000 | −13.288 | 18.500 | −3.901 | −0.173 |
| | 2 | 0.999 | −12.904 | 18.486 | −3.878 | −0.173 |
| | 3 | 1.246 | −11.412 | 23.058 | −4.584 | −0.173 |
| | 4 | 1.273 | −11.370 | 23.553 | −4.667 | −0.173 |
| | 5 | 1.275 | −11.366 | 23.579 | −4.671 | −0.173 |
| | 6 | 1.283 | −11.042 | 23.742 | −4.682 | −0.173 |
| Second lens unit | 18 | 1.506 | −3.171 | 9.973 | −1.277 | −0.082 |
| | 19 | 1.496 | −3.074 | 9.814 | −1.246 | −0.081 |
| | 20 | 1.682 | −2.453 | 9.787 | −1.089 | −0.070 |
| | 21 | 1.747 | −2.456 | 10.049 | −1.103 | −0.069 |
| | 22 | 1.901 | −2.405 | 10.604 | −1.117 | −0.067 |
| | 23 | 1.965 | −2.425 | 10.883 | −1.135 | −0.066 |
| | 24 | 2.379 | −2.554 | 12.704 | −1.256 | −0.063 |
| | 25 | 2.382 | −2.549 | 12.710 | −1.255 | −0.063 |
| | 26 | 2.434 | −2.557 | 12.925 | −1.268 | −0.063 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-164266, filed Jul. 25, 2012, which is hereby incorporated by reference herein in its entirety.

What is claimed is:

1. A zoom lens comprising, in order from an object side toward an image forming side:

a first lens unit having positive refractive power that does not move during zooming;

a second lens unit having negative refractive power that moves during zooming;

a third lens unit that moves during zooming;

an aperture stop; and a fourth lens unit having positive refractive power that does not move during zooming, wherein the first lens unit includes, in order from the object side toward the image forming side:

a front first lens unit having negative refractive power that does not move;

a middle first lens unit having positive refractive power that moves during focus adjustment; and a rear first lens unit having positive refractive power that does not move;

wherein each of the front first lens unit and the second lens unit includes at least one positive lens and at least two negative lenses, and wherein the following expressions are satisfied:

$$\frac{\theta 11p - \theta 11n}{v11p - v11n} < -3.2 \times 10^{-3}; \text{ and}$$

$$-8.0 < f11cp/f11 < -2.5,$$

where v11p and θ11p respectively represent an average value of Abbe constants and an average value of partial dispersion ratios of lenses having positive refractive power in the front first lens unit, v11n and θ11n respectively represent an average value of Abbe constants and an average value of partial dispersion ratios of lenses having negative refractive power in the front first lens unit, f11cp represents a combined focal length of the lenses having positive refractive power in the front first lens unit, and f11 represents a focal length of the front first lens unit, and wherein an Abbe constant vd and a partial dispersion ratio θgF are defined a follows:

$vd=(Nd-1)/(NF-NC)$; and $\theta gF=(Ng-NF)/(NF-NC)$, where Ng, NF, Nd, and NC represent refractive indices for g-line, F-line, d-line, and C-line, respectively.

2. The zoom lens according to claim 1, wherein the front first lens unit satisfies the following expression:

$5.0 < v11n - v11p < 50.0$.

3. The zoom lens according to claim 1, wherein the following expression is satisfied:

$1.0 < fT/f1 < 5.0$, where f1 represents a focal length of the first lens unit in focus at infinity, and fT represents a focal length of the entire zoom lens at a telephoto end.

4. The zoom lens according to claim 1, wherein the following expression is satisfied:

$$-7.5 \times 10^{-4} \times fT/f1 - 2.0 \times 10^{-3} < \frac{\theta 2p - \theta 2n}{v2p - v2n},$$

where v2p and θ2p respectively represent an average value of Abbe constants and an average value of partial dispersion ratios of materials of positive lenses in the second lens unit, and v2n and θ2n respectively represent an average value of Abbe constants and an average value of partial dispersion ratios of materials of negative lenses in the second lens unit.

5. The zoom lens according to claim 1, wherein:
the third lens unit has positive refractive power,
the fourth lens unit includes, in order from the object side toward the imaging forming side:
 a front fourth lens unit having negative refractive power;
 a middle fourth lens unit as a zooming lens unit insertable into and removable from the optical path to change a focal length range of the entire zoom lens; and
 a rear fourth lens unit having positive refractive power, and the following expression is satisfied:

$$2.0 < \frac{\left(\frac{\theta 42p - \theta 42n}{v42p - v42n}\right)}{\left(\frac{\theta 43p - \theta 43n}{v43p - v43n}\right)} < 4.0,$$

where v42p and θ42p respectively represent an average value of Abbe constants and an average value of partial dispersion ratios of materials of positive lenses in the middle fourth lens unit, v42n and θ42n respectively represent an average value of Abbe constants and an average value of partial dispersion ratios of materials of negative lenses in the middle fourth lens unit, v43p and θ43p respectively represent an average value of Abbe constants and an average value of partial dispersion ratios of materials of positive lenses in the rear fourth lens unit, and v43n and θ43n respectively represent an average value of Abbe constants and an average value of partial dispersion ratios of materials of negative lenses in the rear fourth lens unit.

6. The zoom lens according to claim 1, wherein:
the third lens unit has negative refractive power,
the fourth lens unit includes, with respect to a largest air interval as a boundary, in order from the object side toward the imaging forming side:
 a front fourth lens unit having positive refractive power; and
 a rear fourth lens unit having positive refractive power, and
the following expression is satisfied:

$$0.5 < \frac{\left(\frac{\theta 4ap - \theta 4an}{v4ap - v4an}\right)}{\left(\frac{\theta 4bp - \theta 4bn}{v4bp - v4bn}\right)} < 2.5,$$

where v4ap and θ4ap respectively represent an average value of Abbe constants and an average value of partial dispersion ratios of materials of positive lenses in the front fourth lens unit, v4an and θ4an respectively represent an average value of Abbe constants and an average value of partial dispersion ratios of materials of negative lenses in the front fourth lens unit, v4 bp and θ4bp respectively represent an average value of Abbe constants and an average value of partial dispersion ratios of materials of positive lenses in the rear fourth lens unit, and v4bn and θ4bn respectively represent an average value of Abbe constants and an average value of partial dispersion ratios of materials of negative lenses in the rear fourth lens unit.

7. An image pickup apparatus comprising:
a zoom lens; and
a camera including an image pickup element for receiving light of a subject image through the zoom lens,
wherein the zoom lens comprises, in order from an object side toward an image forming side:
 a first lens unit having positive refractive power that does not move during zooming;
 a second lens unit having negative refractive power that moves during zooming;
 a third lens unit that moves during zooming;
 an aperture stop; and
 a fourth lens unit having positive refractive power that does not move during zooming,
wherein the first lens unit includes, in order from the object side toward the image forming side:
 a front first lens unit having negative refractive power that does not move;
 a middle first lens unit having positive refractive power that moves during focus adjustment; and
 a rear first lens unit having positive refractive power that does not move,
wherein each of the front first lens unit and the second lens unit includes at least one positive lens and at least two negative lenses, and
wherein the following expressions are satisfied:

$\frac{\theta 11p - \theta 11n}{v11p - v11n} < -3.2 \times 10^{-3}$; and $-8.0 < f11cp/f11 < -2.5$, where v11p and θ11p respectively represent an average value of Abbe constants and an average value of partial dispersion ratios of lenses having positive refractive power in the front first lens unit, v11n and θ11n respectively represent an average value of Abbe constants and an average value of partial dispersion ratios of lenses having negative refractive power in the front first lens unit, f11cp represents a combined focal length of the lenses having positive refractive power in the front first lens unit and f11 represents a focal length of the front first lens unit, and wherein an Abbe constant vd and a partial dispersion ratio θgF are defined a follows:

$vd=(Nd-1)/(NF-NC)$; and $\theta gF=(Ng-NF)/(NF-NC)$, where Ng, NF, Nd, and NC represent refractive indices for g-line, F-line, d-line, and C-line, respectively.

8. A zoom lens, comprising, in order from an object side toward an image forming side:
a first lens unit having positive refractive power that does not move during zooming;
a second lens unit having negative refractive power that moves during zooming;
a third lens unit that moves during zooming;
an aperture stop; and
a fourth lens unit having positive refractive power that does not move during zooming,
wherein the first lens unit includes, in order from the object side toward the image forming side:
  a front first lens unit having negative refractive power that does not move;
  a middle first lens unit having positive refractive power that moves during focus adjustment; and
  a rear first lens unit having positive refractive power that does not move,
wherein each of the front first lens unit and the second lens unit includes at least one positive lens and at least two negative lenses, and
wherein the following expressions are satisfied:

$$\frac{\theta 11p - \theta 11n}{v11p - v11n} < -3.2 \times 10^{-3};\ \text{and}$$

$$-8.0 < f11cp/f11 < -1.0,$$

where v11p and θ11p respectively represent an average value of Abbe constants and an average value of partial dispersion ratios of lenses having positive refractive power in the front first lens unit, v11n and θ11n respectively represent an average value of Abbe constants and an average value of partial dispersion ratios of lenses having negative refractive power in the front first lens unit, f11cp represents a combined focal length of the lenses having positive refractive power in the front first lens unit and f11 represents a focal length of the front first lens unit, and wherein an Abbe constant vd and a partial dispersion ratio θgF are defined a follows:

$vd=(Nd-1)/(NF-NC)$; and $\theta gF=(Ng-NF)/(NF-NC)$, where Ng, NF, Nd, and NC represent refractive indices for g-line, F-line, d-line, and C-line, respectively,
wherein the third lens unit has positive refractive power, and wherein the fourth lens unit includes, in order from the object side toward the imaging forming side:
  a front fourth lens unit having negative refractive power;
  a middle fourth lens unit as a zooming lens unit insertable into and removable from the optical path to change a focal length range of the entire zoom lens; and
  a rear fourth lens unit having positive refractive power, and
wherein the following expression is satisfied:

$$2.0 < \frac{\left(\frac{\theta 42p - \theta 42n}{v42p - v42n}\right)}{\left(\frac{\theta 43p - \theta 43n}{v43p - v43n}\right)} < 4.0,$$

where v42p and θ42p respectively represent an average value of Abbe constants and an average value of partial dispersion ratios of materials of positive lenses in the middle fourth lens unit, v42n and θ42n respectively represent an average value of Abbe constants and an average value of partial dispersion ratios of materials of negative lenses in the middle fourth lens unit, v43p and θ43p respectively represent an average value of Abbe constants and an average value of partial dispersion ratios of materials of positive lenses in the rear fourth lens unit, and v43n and θ43n respectively represent an average value of Abbe constants and an average value of partial dispersion ratios of materials of negative lenses in the rear fourth lens unit.

9. The zoom lens according to claim 8, wherein the front first lens unit satisfies the following expression:

$5.0 < v11n - v11p < 50.0$.

10. The zoom lens according to claim 8, wherein the following expression is satisfied:

$1.0 < fT/f1 < 5.0$, where f1 represents a focal length of the first lens unit in focus at infinity, and fT represents a focal length of the zoom lens at a telephoto end.

11. The zoom lens according to claim 8, wherein the following expression is satisfied:

$$-7.5 \times 10^{-4} \times fT/f1 - 2.0 \times 10^{-3} < \frac{\theta 2p - \theta 2n}{v2p - v2n},$$

where v2p and θ2p respectively represent an average value of Abbe constants and an average value of partial dispersion ratios of materials of positive lenses in the second lens unit, and v2n and θ2n respectively represent an average value of Abbe constants and an average value of partial dispersion ratios of materials of negative lenses in the second lens unit.

12. An image pickup apparatus comprising:
a zoom lens; and
a camera including an image pickup element for receiving light of a subject image through the zoom lens,
wherein the zoom lens comprises, in order from an object side toward an image forming side:
  a first lens unit having positive refractive power that does not move during zooming;
  a second lens unit having negative refractive power that moves during zooming;
  a third lens unit that moves during zooming;
  an aperture stop; and a fourth lens unit having positive refractive power that does not move during zooming, wherein the first lens unit includes, in order from the object side toward the image forming side:
- a front first lens unit having negative refractive power that does not move;
- a middle first lens unit having positive refractive power that moves during focus adjustment; and
- a rear first lens unit having positive refractive power that does not move, wherein each of the front first lens unit and the second lens unit includes at least one positive lens and at least two negative lenses, and wherein the following expressions are satisfied:

$$\frac{\theta 11p - \theta 11n}{v11p - v11n} < -3.2 \times 10^{-3}; \text{ and}$$

$$-8.0 < f11cp/f11 < -1.0$$

where v11p and θ11p respectively represent an average value of Abbe constants and an average value of partial dispersion ratios of lenses having positive refractive power in the front first lens unit, v11n and θ11n respectively represent an average value of Abbe constants and an average value of partial dispersion ratios of lenses having negative refractive power in the front first lens unit, f11cp represents a combined focal length of the lenses having positive refractive power in the front first lens unit and f11 represents a focal length of the front first lens unit, and wherein an Abbe constant vd and a partial dispersion ratio θgF are defined a follows:

$vd = (Nd-1)/(NF-NC)$; and $\theta gF = (Ng-NF)/(NF-NC)$, where Ng, NF, Nd, and NC represent refractive indices for g-line, F-line, d-line, and C-line, respectively, wherein the third lens unit has positive refractive power, wherein the fourth lens unit includes, in order from the object side toward the imaging forming side:
- a front fourth lens unit having negative refractive power;
- a middle fourth lens unit as a zooming lens unit insertable into and removable from the optical path to change a focal length range of the entire zoom lens; and
- a rear fourth lens unit having positive refractive power, and wherein the following expression is satisfied:

$$2.0 < \frac{\left(\frac{\theta 42p - \theta 42n}{v42p - v42n}\right)}{\left(\frac{\theta 43p - \theta 43n}{v43p - v43n}\right)} < 4.0,$$

where v42p and θ42p respectively represent an average value of Abbe constants and an average value of partial dispersion ratios of materials of positive lenses in the middle fourth lens unit, v42n and θ42n respectively represent an average value of Abbe constants and an average value of partial dispersion ratios of materials of negative lenses in the middle fourth lens unit, v43p and θ43p respectively represent an average value of Abbe constants and an average value of partial dispersion ratios of materials of positive lenses in the rear fourth lens unit, and v43n and θ43n respectively represent an average value of Abbe constants and an average value of partial dispersion ratios of materials of negative lenses in the rear fourth lens unit.

* * * * *